United States Patent
Shibutani et al.

(10) Patent No.: US 8,973,351 B2
(45) Date of Patent: Mar. 10, 2015

(54) WORK MACHINE

(71) Applicant: Kubota Corporation, Osaka-shi (JP)

(72) Inventors: Akiya Shibutani, Sakai (JP); Kazuya Maeda, Sakai (JP); Akihiro Matsuzaki, Sakai (JP)

(73) Assignee: Kubota Corporation, Osaka (JP)

( * ) Notice: Subject to any disclaimer, the term of this patent is extended or adjusted under 35 U.S.C. 154(b) by 115 days.

(21) Appl. No.: 13/621,543

(22) Filed: Sep. 17, 2012

(65) Prior Publication Data

US 2013/0133315 A1    May 30, 2013

(30) Foreign Application Priority Data

Nov. 29, 2011 (JP) ................................. 2011-260251
Feb. 1, 2012 (JP) ................................. 2012-020010

(51) Int. Cl.

| F01N 3/00 | (2006.01) |
|---|---|
| F01N 3/02 | (2006.01) |
| F01N 9/00 | (2006.01) |
| F02D 41/02 | (2006.01) |
| F01N 3/025 | (2006.01) |
| F02D 41/06 | (2006.01) |
| F02D 41/40 | (2006.01) |
| F02D 41/22 | (2006.01) |

(52) U.S. Cl.
CPC .............. *F01N 9/002* (2013.01); *F02D 41/029* (2013.01); *Y02T 10/47* (2013.01); *F01N 3/0253* (2013.01); *F01N 2590/08* (2013.01); *F02D 2200/604* (2013.01); *F02D 41/0235* (2013.01); *F02D 41/0245* (2013.01); *F02D 41/062* (2013.01); *F02D 41/405* (2013.01); *F02D 2041/228* (2013.01); *F02D 2200/0812* (2013.01)

USPC .................... 60/295; 60/285; 60/286; 60/311

(58) Field of Classification Search
USPC ..................................... 60/285, 286, 295, 311
See application file for complete search history.

(56) References Cited

U.S. PATENT DOCUMENTS

2012/0180463 A1* 7/2012 Oohashi et al. .................. 60/297

FOREIGN PATENT DOCUMENTS

| EP | 466664 A1 * | 1/1992 | ............. B26D 33/06 |
| EP | 1801370 A1 | 6/2007 | |
| JP | 2005271705 A | 10/2005 | |
| JP | 200683817 A | 3/2006 | |
| JP | 2006097623 A * | 4/2006 | ............. F02D 41/04 |
| JP | 2011256845 A | 12/2011 | |
| WO | WO 2011049137 A1 * | 4/2011 | ............... F01N 3/02 |

* cited by examiner

*Primary Examiner* — Audrey K Bradley
(74) *Attorney, Agent, or Firm* — The Webb Law Firm

(57) ABSTRACT

A work machine includes a diesel engine; a gas emission cleaning device having a filter for trapping particulate matter included in gas emissions emitted from the diesel engine; and a filter regenerating device for performing automatic regeneration to automatically combust and eliminate particulate manner that has accumulated in the gas emission cleaning device, when the accumulated amount of the particulate matter has exceeded a predetermined value. The filter regenerating device has an automatic-regeneration-allowing device for allowing the automatic regeneration to be carried out by an external command; and, at startup, the automatic-regeneration-allowing device disallows carrying out automatic regeneration.

10 Claims, 11 Drawing Sheets

WORK MACHINE

BACKGROUND OF THE INVENTION

1. Field of the Invention

The present invention relates to work machine, such as a tractor, wheel loader, or backhoe that is provided with a diesel particulate filter (DPF).

2. Description of the Related Art

In order to mitigate and address recent environmental issues, regulations concerning gas emissions from diesel engines and the like have become more stringent. In the field of work vehicles such as agricultural machinery and construction machinery as well, various techniques for reducing particulate matter (PM) included in gas emissions. have been developed in order to comply with such gas emission regulations.

Typically, a diesel engine is furnished with a gas emission cleaning system for trapping particulate matter included in gas emissions. In a gas emission cleaning system, gas emissions are passed through a diesel particulate filter (DPF) furnished in the interior, to trap the particulate matter. The trapped particulate matter accumulates in the DPF of the gas emission cleaning system, and therefore the DPF must be regenerated to eliminate the particulate matter in an appropriate manner, so that the DPF does not gradually give rise to clogging and to a high level of air resistance in the exhaust system.

Such a technique relating to regeneration of a DPF is the DPF system disclosed in Japanese Laid-Open Patent Application 2011-256845, for example.

The DPF system disclosed in Japanese Laid-Open Patent Application 2011-256845 is provided with: a diesel particulate filter connected to the exhaust pipe of a diesel engine, and comprising a filter for trapping PM in exhaust gases, and an oxidation catalyst furnished to the upstream side of the filter; and temperature sensors respectively furnished to the upstream side and downstream side of the oxidation catalyst. In this DPF system, when the amount of accumulated PM in the filter exceeds a given amount, regeneration of the diesel particulate filter is performed, with the temperature detected by the temperature sensor at the upstream side of the oxidation catalyst set at or above a first threshold value, and the temperature detected by the temperature sensor at the downstream side of the oxidation catalyst set at or above a second threshold value. When a malfunction of the temperature sensor at the upstream side of the oxidation catalyst has been detected, the second threshold value is modified upward.

SUMMARY OF THE INVENTION

The DPF system of Japanese Laid-Open Patent Application 2011-256845 has been proposed based on conventional methods for DPF regeneration, and the technique is applicable both to manual regeneration carried out with the vehicle in the stopped state, and to automatic regeneration that is possible to carry out while the vehicle is traveling. In Patent Document 1, because manual regeneration and automatic regeneration have their respective merits and demerits, it is disclosed as being preferable to appropriately select between them, depending on conditions.

As described also in Japanese Laid-Open Patent Application 2011-256845, DPF automatic regeneration is a regeneration method whereby, once particulate matter accumulated in the DPF is at or above a predetermined value, even if the vehicle is traveling, the vehicle initiates regeneration of the DPF automatically, with no command from the operator. It is common knowledge that, in DPF regeneration, particulate matter within the DPF is combusted by raising the temperature of the DPF, and reducing the accumulated particulate matter. With such automatic regeneration of the DPF, there are instances in which, regardless of the operator's intention, the temperature of the DPF, specifically, the exhaust temperature, reaches a very high temperature before the operator becomes aware of it.

With agricultural work machines as well, there are numerous adverse situations which may result from exhaust temperature reaching a very high temperature before the operator becomes aware of it. For example, because agricultural work machines sometimes travel through crop rows, there is a risk of adverse effects on crops when the exhaust temperature reaches high temperature. Moreover, because agricultural work machines may enter not just crop rows, but also livestock sheds, when the exhaust temperature reaches high temperature, there is a possibility of adverse effects on the livestock breeding environment as well.

With the foregoing in view, there exists a need for a work machine that can carry out automatic regeneration of the DPF, only after reliable verification of the intention of the operator.

The work machine of the present invention comprises:

a diesel engine;

a gas emission cleaning device having a filter for trapping particulate matter included in gas emissions emitted from the diesel engine; and filter regenerating means for performing automatic regeneration to automatically combust and eliminate particulate manner that has accumulated in the gas emission cleaning device, when the accumulated amount of the particulate matter has exceeded a predetermined value;

wherein the filter regenerating means has automatic-regeneration-allowing means for allowing the automatic regeneration to be carried out by an external command; and, at startup, the automatic-regeneration-allowing means disallows carrying out automatic regeneration.

According to the aspect described above, at startup, the automatic-regeneration-allowing means disallows carrying out automatic regeneration, and therefore DPF automatic regeneration can be performed in a way such that automatic regeneration does not start before the operator notices. In so doing, when the work machine initiates automatic regeneration, a command is always obtained from the operator; therefore, automatic regeneration can be prevented from starting, and a rise in exhaust temperature can be prevented, in a location not intended by the user, whether it is a farm field, a livestock shed, or the like.

In preferred practice, the aspect described above has an automatic-regeneration-allowing switch for outputting a command allowing the automatic regeneration to be carried out; when the accumulated amount of particulate matter has exceeded the predetermined value, the filter regenerating means outputs an alert signal showing the necessity to carry out the automatic regeneration; and during the interval that the filter regenerating means is outputting the alert signal, the automatic-regeneration-allowing means allows the automatic regeneration to be performed on the filter regenerating means provided that a command allowing the automatic regeneration to be carried out is received from the automatic-regeneration-allowing switch.

According to the aspect described above, the operator is notified once a state is assumed in which automatic regeneration is possible, and the system waits for a command from the operator, to carry out or continue automatic regeneration. In so doing, not only can automatic regeneration be avoided at locations not intended by the operator, but automatic regeneration can be performed at appropriate times at the location intended by the operator.

In the aspect described above, in preferred practice, the automatic-regeneration-allowing switch outputs a command for allowing automatic regeneration to be carried out, and outputs a command for disallowing the allowed automatic regeneration from being carried out.

According to the aspect described above, once automatic regeneration has begun, it can be suspended at any timing intended by the operator. Or, in the event that automatic regeneration has not yet begun, automatic regeneration can be configured not to begin at a later point in time.

In the aspect described above, in preferred practice, the filter regenerating means outputs the alert signal to the automatic-regeneration-allowing switch; and, based on the outputted alert signal, the automatic-regeneration-allowing switch issues an alert that the automatic regeneration must be carried out.

According to the aspect described above, notification that automatic regeneration has become possible is provided by the switch that outputs the command to allow automatic regeneration to be carried out, and therefore, from the operator's perspective, the member that receives the alert and the switch that commands that automatic regeneration be allowed are the same. For example, notification that automatic regeneration has become possible is provided by the switch flashing on and off, and therefore, simply by operating the flashing switch, the operator can command that automatic regeneration be allowed.

In the aspect described above, in preferred practice, the automatic-regeneration-allowing switch is furnished between the peripheral edge part of a display device, and the peripheral edge part of an opposed face situated on the cover of the display device and opposing the driver's seat.

According to the aspect described above, during driving, a worker can verify the state of the automatic-regeneration-allowing switch in simple fashion, in a manner comparable to looking at a display device, without having to focus particularly at the automatic-regeneration-allowing switch. Stated another way, when the worker looks at the display device, the automatic-regeneration-allowing switch lies in the same field of vision, and therefore the state of the automatic-regeneration-allowing switch can be verified in simple fashion.

In the aspect described above, in preferred practice, the automatic-regeneration-allowing switch is furnished on a diagonal incline in a section corresponding to one side of the steering wheel in the horizontal direction, when viewed from the side of the steering wheel furnished between the display device and the driver's seat.

According to the aspect described above, the driver can easily extend a hand from a side of the steering wheel and push the automatic-regeneration-allowing switch while operating the steering wheel, and the automatic-regeneration-allowing switch can be operated in a simple manner even while driving.

In the aspect described above, in preferred practice, an mounting part for the purpose of furnishing the automatic-regeneration-allowing switch is formed between a first left/right edge part formed to one side in the horizontal direction of the peripheral edge part of the display device, and a second left/right edge part formed to one side in the horizontal direction of the peripheral edge part of the opposed face.

According to the aspect described above, the automatic-regeneration-allowing switch is disposed close to (nearby) the left side or the right side of the display device, and the state of the automatic-regeneration-allowing switch can be verified together with that of the display device, in a manner comparable to the automatic-regeneration-allowing switch being disposed within the display device.

DESCRIPTION OF THE PREFERRED EMBODIMENTS

An embodiment of the present invention is described below, while making reference to the drawings.

This work machine is provided with a diesel particulate filter (DPF). The work machine could be an agricultural work machine such as a tractor, or a construction work machine such as backhoe or compact truck loader (CTL); in the present embodiment, a tractor is described by way of an example of an agricultural work machine.

Figure 11:
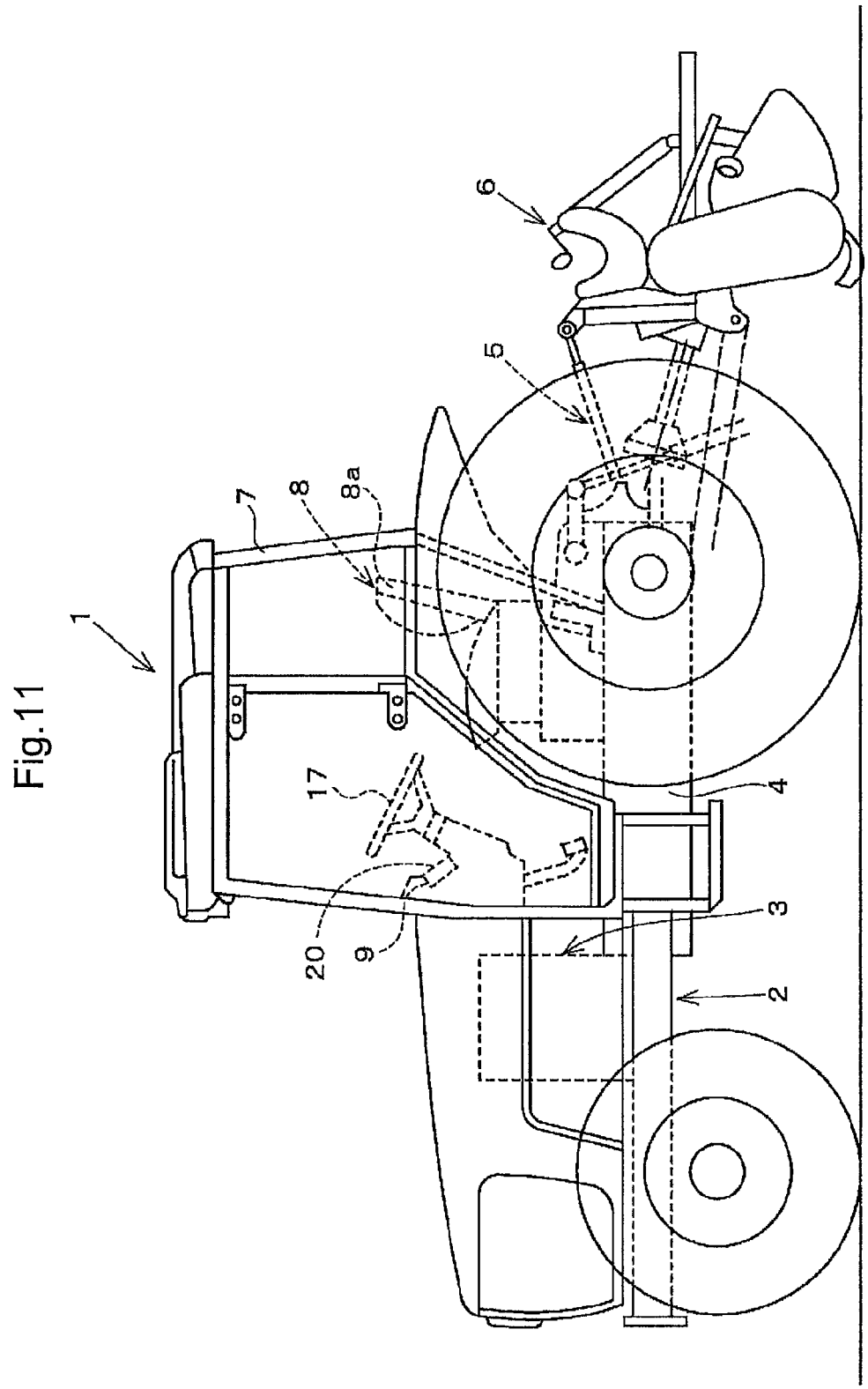
FIG. 11 is a side view of an entire tractor.

As shown in FIG. 11, in a tractor 1, a traveling vehicle body 2 having wheels at front and rear is equipped with an engine (for example, a diesel engine) 3, a gearshift 4, etc. The rear part of the traveling vehicle body 2 is furnished with a three-point link mechanism 5 adapted to lift and lower. Various kinds of work devices (the illustrated example is a rotary tilling device) 6 are detachably attached to the three-point link mechanism 5. Power from the diesel engine 3 is transmitted to the work device 6 via a PTO shaft. To the back of the diesel engine 3 there is furnished a cabin 7 of independently-equipped design, with a driver's seat 8 being furnished inside the cabin 7, and a display device 9 for displaying the state of the tractor 1 being furnished to the front of the driver's seat 8 along the direction of advance of the tractor 1, for example. Owing to this constitution, the tractor 1 can travel, as well as carrying out work using the work device 6.

The display device 9 for displaying states of action of the tractor 1 through meters, monitors, and the like furnished around the driver's seat 8 will be described while referring to FIG. 2.

Figure 2:
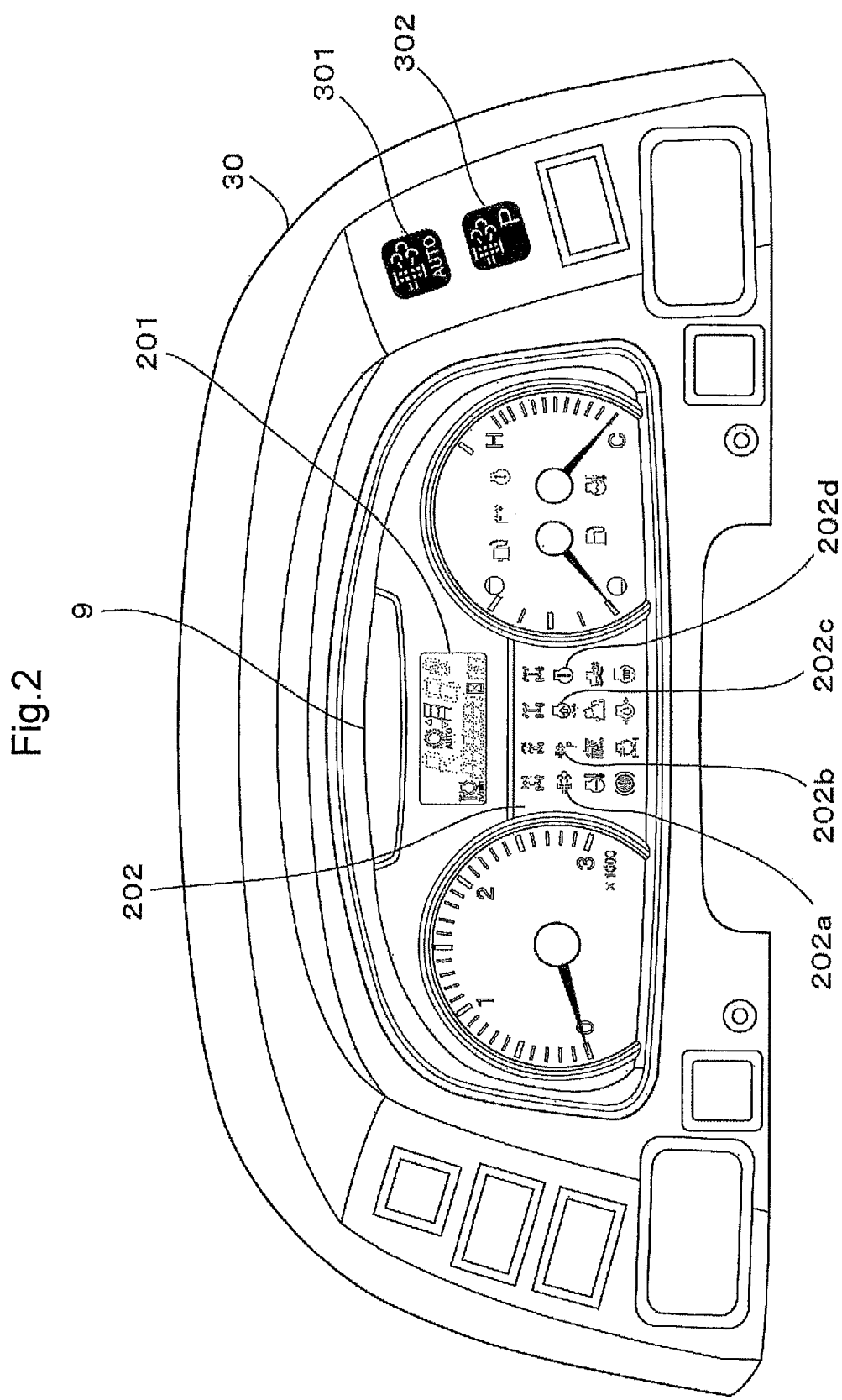
FIG. 2 is a drawing showing a simplified constitution of a display device of a tractor.

As shown in FIG. 2, the display device 9 is provided with a liquid crystal panel 201, and LED display sections 202. The liquid crystal panel 201, which is disposed in the upper center section of the display device 9 facing the plane of the page, can freely display text and graphics by a liquid crystal display, and the displayed text and graphics are modifiable as well.

Further, in FIG. 2, the LED display sections 202 are furnished below the liquid crystal panel 201. The LED display sections 202 use LED elements to turn steady on, extinguish, or flash pictorial symbols and graphics, and thereby display detected information that has been detected by sensors connected to a controller 60 (an engine ECU 61 and a main ECU 62), discussed later.

In more detail, the LED display sections 202 have an automatic regeneration alert LED display section 202a for providing alerts about the state of regeneration of the DPF; a parked regeneration request LED display section 202b for requesting parking and regeneration of the DPF; an engine-speed-increase-request LED display section 202c for requesting a rise in engine speed; and a contact dealer alert LED display section 202d for issuing an alert when maintenance work at the dealer is necessary.

Besides the four LED display sections mentioned above, the LED display sections 202 include a warning LED display section for showing that a warning has been issued; an oil pressure LED display section for showing warnings about engine oil pressure; a battery LED display section for showing warnings about the state of charge of the battery; a speed LED display section for showing speed warnings; an exhaust LED display section for showing warnings about exhaust temperature, and the like. In the LED display sections 202, the mode of display can be varied freely, not just by causing the LEDs to be illuminated, to be extinguished, or to be made to flash, but also by modifying the illumination time, the extinguishing time, the flash interval, or the brightness during illumination.

The pictorial symbols and graphics shown by the LED display sections 202 of FIG. 2 can be displayed on the liquid crystal panel 201 as well. By causing pictorial symbols and graphics of the LED display sections 202 to be displayed, not display, highlighted, or otherwise represented on the liquid crystal panel 201, information comparable to that on the LED display sections 202 can be displayed. Therefore, the pictorial symbols and graphics that, in the present embodiment, are shown as the LED display sections 202 could instead be displayed on the liquid crystal panel 201.

In the display device 9 shown in FIG. 2, indicator needle type meters are furnished to the left and right sides of the liquid crystal panel 201 and the LED display sections 202 facing the plane of the page. To the left side facing the plane of the page, there is furnished an indicator needle type revolution counter that displays the speed of the diesel engine 3, and to the right side, there are furnished an indicator needle type remaining fuel gauge that displays the remaining fuel, and an indicator needle type water temperature gauge that displays the temperature of the coolant of the diesel engine 3.

As shown in FIG. 2, the display device 9 provided with the variety of display means is accommodated inside a meter hood 30. Through enclosure around the display device 9, the meter hood 30 protects the display device 9, as well as fulfilling the role of an eave for preventing outside light from entering the display device 9, making it difficult to see the display content.

In the meter hood 30, to the right side facing the plane of the page, there are furnished an automatic-regeneration-allowing switch 301 for allowing or revoking permission for automatic regeneration of the DPF, and a parked regeneration initiation switch 302 for issuing a command to initiate parking and regeneration of the DPF.

The automatic-regeneration-allowing switch 301 and the parked regeneration initiation switch 302 are, for example, button type switches designed to switch by being pushed. The workings of the automatic-regeneration-allowing switch 301 and the parked regeneration initiation switch 302, as well as automatic regeneration and parked regeneration of the DPF, are discussed below.

Figure 1:
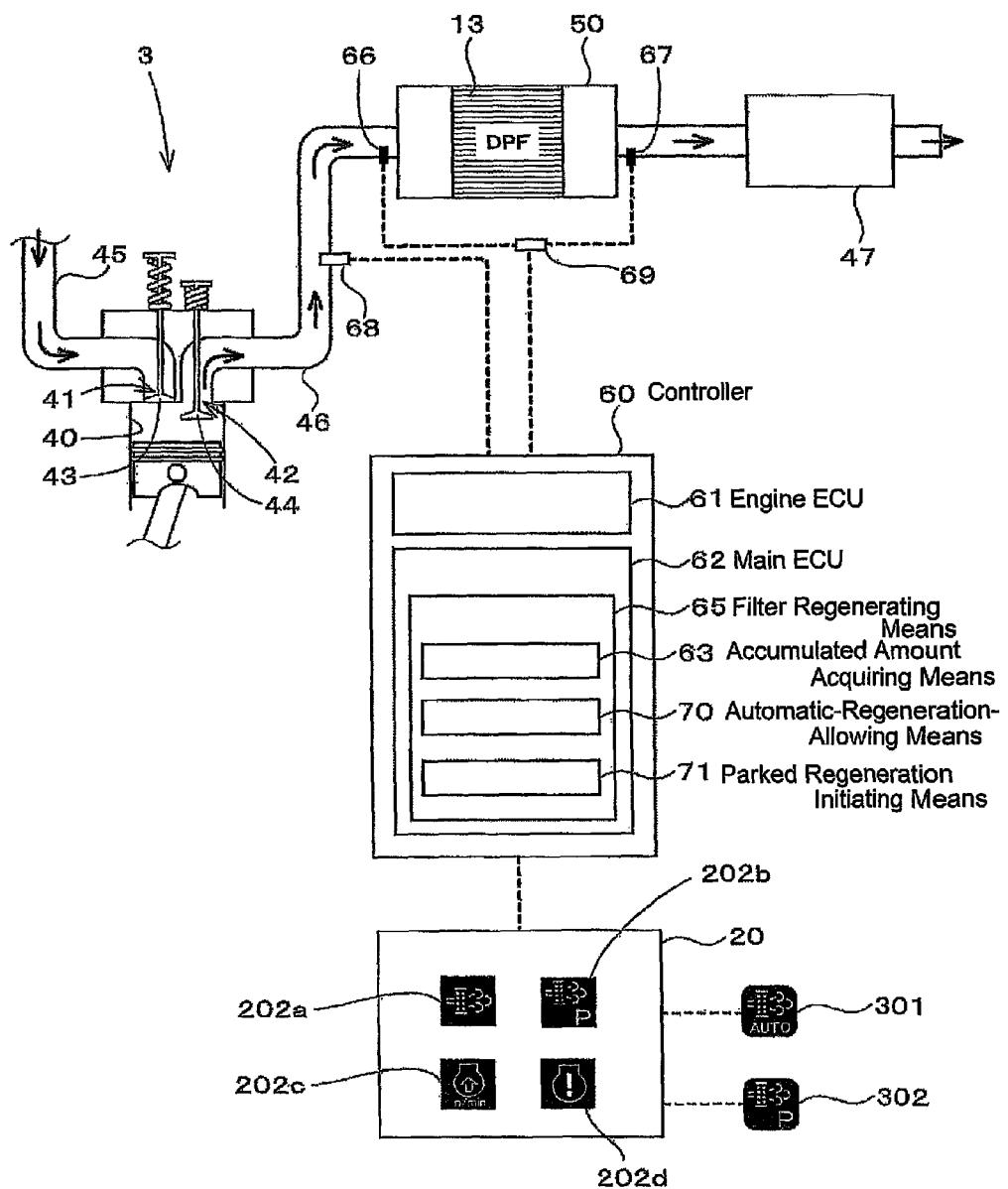
FIG. 1 is a drawing showing the constitution of a gas emission cleaning device furnished to the exhaust system of the diesel engine of a tractor according to an example of the present invention.

Next, the structure of the diesel engine 3 and of the exhaust system of the diesel engine 3 are described while referring to FIG. 1. In most cases, the diesel engine 3 is a multi-cylinder engine having a plurality of cylinders; in FIG. 1, however, the constitution of one cylinder 40 from among these is described.

As shown in FIG. 1, in the upper part of the cylinder 40 of the diesel engine 3, there is formed an intake port 41 which is an opening for air to be drawn into the cylinder 40, and there is also formed an exhaust port 42 which is an opening for emitting gases subsequent to combustion (combustion gases) from the cylinder 40. The upper part of the cylinder 40 is further furnished with an intake valve 43 for opening and closing the intake port 41, and an exhaust valve 44 for opening and closing the exhaust port 42.

An intake manifold 45 of tube shape serving as a flow channel for air to be drawn into the cylinder 40 is connected to the intake port 41, and an exhaust manifold 46 of tube shape serving as a flow channel for combustion gases emitted from the cylinder 40 is connected to the exhaust port 42. A silencer 47 for the purpose of reducing exhaust noise is furnished to the end of the exhaust manifold 46, and the combustion gases pass through the silencer 47 and are emitted into the environment.

In the exhaust manifold 46, a gas emission cleaning device 50 is furnished between the exhaust port 42 and the silencer 47. The gas emission cleaning device 50 cleans the combustion gases passing through it, by trapping the particulate matter (PM) included therein. Specifically, the combustion gases emitted from the cylinder 40 through the exhaust port 42 pass in the form of gas emissions through exhaust manifold 46, and are cleaned by the gas emission cleaning device 50 before reaching the silencer 47.

This gas emission cleaning device 50 has an internal diesel particulate filter (DPF) 13. The DPF 13 is a filter for trapping particulate matter PM included in gas emissions, and is formed, for example, so as to have a cross section of honeycomb structure made of ceramic or metal. Specifically, from one end to the other along the lengthwise direction of the DPF 13, there are adjacently situated a multitude of polygonal through-holes having the shape of, for example, a hexagonal columnar straw, and within the through-holes, porous cross walls are furnished at predetermined spacing along the lengthwise direction of the DPF 13. The DPF 13 having this type of honeycomb structure is constituted such that the positions of the cross walls formed in the lengthwise direction of the DPF 13 within a through-hole differ from the positions of the cross walls formed in neighboring through-holes.

The gas emissions having entered from one end of the DPF 13 flow towards the other end of the DPF 13 while passing through the porous cross walls formed in the through-holes. The particulate matter included in the gas emissions is trapped in the DPF 13 by becoming deposited on the porous cross walls, or deposited on the inner walls of the through-holes, and accumulates there. Specifically, the DPF 13 has a structure that gives rise to clogging when the amount of accumulated particulate matter becomes great, and therefore cleaning must be performed as appropriate, so that the accumulated amount of particulate matter (PM accumulated amount) does not become too great.

In the present embodiment, this cleaning of the DPF 13 is termed "regeneration of the DPF", and the action of doing so is termed the "action of regenerating the DPF." In the action of regenerating the DPF 13, the temperature of the DPF 13 is caused to rise to or above predetermined temperature, combusting and gasifying the accumulated particulate matter, which is emitted into the atmosphere together with the gas emissions.

While not illustrated in the drawing, in addition to the DPF 13, the gas emission cleaning device 50 has an oxidation catalyst or the like, for oxidizing fuel in the particulate matter, and oxides of nitrogen in the combustion gases.

The entry side of the gas emission cleaning device 50 is furnished with an entry-side pressure sensor 66 for detecting the exhaust pressure in proximity to the entrance of the gas emission cleaning device 50, and the exit side is furnished with an exit-side pressure sensor 67 for detecting the exhaust pressure in proximity to the exit. The entry-side pressure sensor 66 and the exit-side pressure sensor 67 are ordinary pressure sensors constituted by piezo elements or the like, for example. The entry-side pressure sensor 66 and the exit-side pressure sensor 67 are connected to a differential pressure sensor 69, described next.

The differential pressure sensor 69 detects the difference in exhaust pressure. Specifically, the pressure differential, between the entry side and the exit side of the gas emission cleaning device 50, from the exhaust pressure detected by the entry-side pressure sensor 66 and the exhaust pressure detected by the exit-side pressure sensor 67. Ordinarily, in a case in which there is no accumulation of particulate matter and no clogging of the DPF 13, the pressure loss in the DPF 13 is very small, and therefore the difference in exhaust pressure detected by the entry-side pressure sensor 66 and the exit-side pressure sensor 67 is slight, so the differential pressure detected by the differential pressure sensor 69 is a small value. However, when particulate matter has accumulated in the DPF 13 to the point that clogging occurs, the pressure loss in the DPF 13 becomes greater, and therefore the differential pressure detected by the differential pressure sensor 69 is greater. The magnitude of this differential pressure corresponds to the extent of clogging of the DPF 13, and therefore the magnitude of the differential pressure can be converted to derive the extent of clogging of the DPF 13, specifically, the PM accumulated amount in the DPF 13.

As shown in FIG. 1, the exhaust manifold 46, which links the diesel engine 3 and the gas emission cleaning device 50, is furnished with an exhaust temperature sensor 68 for detecting the temperature of the combustion gases (exhaust temperature) emitted from the diesel engine 3 and heading towards the gas emission cleaning device 50. The exhaust temperature sensor 68 is constituted, for example, by a thermistor or the like. The differential pressure detected by the differential pressure sensor 69 in the manner discussed above, and the exhaust temperature detected by the exhaust temperature sensor 68, are sent to the controller 60.

The controller 60 is constituted by a plurality of control devices (ECU) that control the tractor 1, and has, for example, an engine ECU 61 that controls the diesel engine 3, and a main ECU 62 that controls overall action of the tractor 1. The engine ECU 61 and the main ECU 62 are constituted by CPUs or the like, for example.

The engine ECU 61 obtains information from sensors installed at locations in the diesel engine 3 and the power transmission system; calculates an optimal fuel injection amount and injection timing, ignition timing, idling speed, and the like, with reference to the state of the engine; and outputs control commands to the diesel engine 3, or other components. For example, when a hand accelerator or a foot accelerator furnished around the driver's seat 8 is manually operated (by performing a manual accelerator operation), the engine ECU 61 detects the amount of manual operation of the accelerator (the degree of opening), and changes the fuel injection amount or other parameters. In this way, the engine speed of the diesel engine 3 can be made to increase or decrease.

As sensors for presenting information to the engine ECU 61, there are an accelerator degree of opening sensor for detecting the degree of opening of the accelerator; the differential pressure sensor 69, which detects the differential pressure of the gas emission cleaning device 50; the exhaust temperature sensor 68, which detects the exhaust temperature; an airflow meter that detects the amount of intake air; a crank position sensor that detects engine speed; a water temperature sensor that detects the water temperature of the coolant; a throttle position sensor that detects the degree of opening of the valve, and the like. In addition, there are a cam position sensor that detects the crank position, an oxygen concentration sensor that detects the oxygen concentration in the intake air, and the like.

The main ECU 62, in tandem with the engine ECU 61, controls the various devices (traveling devices, work devices, and the like) which are provided to the tractor 1. For example, the main ECU 62 performs flow rate control to supply hydraulic oil to a hydraulic device to bring about action of the three-point link.

This flow rate control is performed by the main ECU 62, based on the amount of manual operation of a manual operation member (manual operation lever) furnished around the driver's seat 8. In detail, when the manual operation lever is swung in one direction (frontward) from a neutral position to input a frontward amount of manual operation, the main ECU 62 outputs electrical current of predetermined value (an actuation signal) to the solenoid of an electromagnetic proportional valve of the three-point link mechanism. In so doing, the electromagnetic proportional valve opens according to the electrical current value, controlling the pilot pressure of a control valve of the three-point link mechanism, whereupon the three-point link mechanism acts in one direction (upward or downward). When the manual operation lever is swung from the neutral position towards the opposite side from the aforedescribed to input a rearward amount of manual operation, the main ECU 62 causes the three-point link mechanism to act towards the opposite side from than when swung frontward. Through manual operation of the manual operation lever in this way, the tractor 1 is made to act under the control of the main ECU 62.

The main ECU 62 also controls the action of the entire tractor 1, including the display device 9. Herein, the display device 9, the engine ECU 61, and the main ECU 62 are connected to one another by a controller area network (CAN communication) or other such vehicular communication network, making it possible to data to be sent and received between them. Any vehicular communication network whereby data can be sent and received between the display device 9, the engine ECU 61, and the main ECU 62 is acceptable, with no particular limit as to the specifications. For example, FlexRay would be acceptable, as would be other networks.

The main ECU 62 in the present embodiment has filter regenerating means 65 for regenerating the DPF 13 of the gas emission cleaning device 50. The filter regenerating means 65 is a computer program executed by the main ECU 62.

The filter regenerating means 65 shown in FIG. 2 performs automatic regeneration, and other tasks based on the accumulated amount of particulate matter (PM accumulated amount) accumulated in the DPF 13. This filter regenerating means 65 is provided with accumulated amount acquiring means 63, and automatic-regeneration-allowing means 70.

From the engine ECU 61, the accumulated amount acquiring means 63 obtains information such as the differential pressure of the gas emission cleaning device 50 (the value detected by the differential pressure sensor 69), the exhaust temperature detected by the exhaust temperature sensor 68, the water temperature of the coolant, the oxygen concentration in the intake air, the fuel injection amount, etc., and calculates and acquires the accumulated amount of particulate matter accumulated in the DPF 13.

Based on an external command, the automatic-regeneration-allowing means 70 allows automatic regeneration to be carried out by the filter regenerating means 65. In more specific terms, after the PM accumulated amount has been detected by the accumulated amount acquiring means 63, in a case in which the PM accumulation amount is equal to or greater than a predetermined value, and moreover the automatic-regeneration-allowing switch 301 has been pushed, the automatic-regeneration-allowing means 70 switches from disallowing to allowing automatic regeneration by the filter regenerating means 65.

In detail, the automatic-regeneration-allowing means 70 has an automatic regeneration flag that shows whether to allow or to disallow automatic regeneration. When the automatic regeneration flag of the automatic-regeneration-allowing means 70 shows to disallow automatic regeneration, even if the PM accumulated amount of the DPF 13 exceeds a predetermined value (a first accumulated amount), the filter regenerating means 65 suspends without initiating automatic regeneration. In a state in which the PM accumulated amount exceeds the first accumulated amount and automatic regeneration has been suspended, when the operator of the tractor 1 depresses the automatic-regeneration-allowing switch 301, changing the automatic regeneration flag from disallow to allow, the filter regenerating means 65 promptly initiates automatic regeneration.

Conversely, when the automatic regeneration flag has allowed automatic regeneration from the start, once the PM accumulated amount of the DPF 13 exceeds the first accumulated amount, the filter regenerating means 65 promptly initiates automatic regeneration. The automatic regeneration flag mentioned above will always disallow automatic regeneration during starting of the diesel engine 3, at startup of the controller 60, or at startup of the main ECU 62; but, as mentioned above, when the automatic-regeneration-allowing switch 301 is depressed, switches from disallow to allow. Moreover, after switching to the flag showing to allow by the automatic-regeneration-allowing switch 301, the operator can again return to the flag showing to disallow, by depressing the automatic-regeneration-allowing switch 301.

When automatic regeneration by the filter regenerating means 65 is allowed (i.e., a state in which the automatic regeneration flag of the automatic-regeneration-allowing means 70 has allowed automatic regeneration), the filter regenerating means 65 executes automatic regeneration by automatically heating up the exhaust temperature within the gas emission cleaning device 50 to a temperature at which the particulate matter accumulated in the DPF 13 combusts (for example, 500-600° C.)

In more specific terms, once the PM accumulated amount is equal to or greater than a predetermined value, as a first regeneration step, the filter regenerating means 65 performs control to increase the load on the diesel engine 3, by outputting to the engine ECU 61 a command to constrict the intake throttle of the diesel engine 3, or the like, raising the exhaust temperature (the temperature of the DPF 13) to about 250° C. Once the first regeneration step is completed, upon verification being made that automatic regeneration has been allowed by input from the automatic-regeneration-allowing switch 301, the system advances to a second regeneration step. Specifically, after the exhaust temperature has been raised to about 250° C., the filter regenerating means 65 waits for the automatic-regeneration-allowing means 70 to allow automatic regeneration, and once allowed by the automatic-regeneration-allowing means 70, advances to the second step.

In the second regeneration step, which is carried out with the DPF 13 at a predetermined temperature (for example, about 250° C.) or above, the filter regenerating means 65 performs post-injection or exhaust pipe injection of fuel, further raising the exhaust temperature (the temperature of the DPF 13), and raising the temperature of the DPF 13 up to about 500° C.-600° C. The particulate matter that has accumulated in the DPF 13 is combusted (oxidized) by the 500-600° C. heat, becoming diminished from the DPF 13. Post-injection and injection into the exhaust pipe referred to herein are techniques that have widely been performed in common rail system diesel engines, conventional diesel engines, and the like. The diesel engine 3 according to the present embodiment is a common rail system diesel engine in which post-injection is performed.

Specifically, in the first regeneration step, when the exhaust temperature (the temperature of the DPF 13) reaches approximately 250° C., at which fuel injected into the combustion gas by post-injection is reliably combusted, and moreover the regeneration allowing means 70 so allows, the filter regenerating means 65 carries out the second regeneration step to perform automatic regeneration.

In the first regeneration step, with the object of raising the exhaust temperature (the temperature of the DPF 13) to approximately 250° C., the filter regenerating means 65 controls the engine ECU 61 to constrict the intake throttle of the diesel engine 3. In the second regeneration step, the filter regenerating means 65 controls the engine ECU 61 to perform post-injection, with the object of further raising the exhaust temperature (the temperature of the DPF 13) that was raised in the first regeneration step, to raise the temperature of the DPF 13 to about 500° C.-600° C.

In this way, when the DPF 13 PM accumulated amount acquired by the accumulated amount acquiring means 63 exceeds a predetermined value (the first accumulated amount), the filter regenerating means 65, taking the opportunity of the first accumulated amount having been exceeded, automatically initiates the first regeneration step regardless of the operator's intention. Once the exhaust temperature has reached approximately 250° C., provided that automatic regeneration has been allowed, the second regeneration step is carried out automatically. In this way, when the PM accumulated amount in the DPF 13 exceeds a predetermined value (the first accumulated amount), in the first regeneration step, the exhaust temperature is raised automatically to approximately 250° C. regardless of the operator's intention; whereas in the second regeneration step in which the exhaust temperature reaches high temperature, the intention of the operator of the tractor 1 is always verified by the automatic-regeneration-allowing switch 301.

Specifically, in the present invention, the automatic-regeneration-allowing means 70 or the like prevents the exhaust temperature from becoming very high before the operator notices, so that the exhaust temperature does not become very high before the operator notices.

The first accumulated amount may be, for example, a value that is about 40% of the capacity of the DPF 13, which is a value at which urgent regeneration of the DPF 13 is not required, yet which it is preferable not to exceed, so as to keep the DPF 13 in a good state.

While simply constricting the intake throttle in the first regeneration step may not bring the exhaust temperature to approximately 250° C., when the tractor 1 performs work in a state in which constriction of the intake throttle in the first regeneration step is maintained, the engine speed rises in association with the nature of the work, and the exhaust temperature rises to approximately 250° C. due to the combination of constriction of the intake throttle and the rise in engine speed.

In addition to the automatic-regeneration-allowing means 70, the filter regenerating means 65 is provided with parked regeneration initiating means 71. On the basis of a command from the parked regeneration initiation switch 302, the parked regeneration initiating means 71 carries out parked regeneration in which regeneration of the DPF 13 is performed while the tractor 1 is parked. This parked regeneration involves regeneration control carried out when the PM accumulated amount in the DPF 13 has exceeded a second accumulated amount greater than the first accumulated amount, and takes place with the tractor 1 in a parked state meeting a predetermined parking prerequisite (parked regeneration prerequisite).

Herein, the predetermined parked regeneration prerequisite is a prerequisite that reliably shows that the tractor 1 is parked, such as having been put into neutral, the diesel engine 3 having been placed in an idling state, the parking brake having been locked, or the PTO switch having been turned off.

As mentioned above, the filter regenerating means 65 is designed to carry out the first regeneration step when the accumulated amount of particulate matter exceeds a first accumulated amount. Herein, the filter regenerating means 65 has a function of outputting an alert signal (alerting means) in the first regeneration step when the accumulated amount of particulate matter exceeds a first accumulated amount, to show that it is necessary to carry out automatic regeneration. In specific terms, when the automatic flag of the automatic-regeneration-allowing means 70 shows that automatic regeneration is currently disallowed, the alerting means outputs to the automatic regeneration alert LED display section 202a an alert signal requesting that execution of the second regeneration step be allowed (an alert signal showing that it is necessary to carry out automatic regeneration), causing the automatic regeneration alert LED display section 202a to flash. The alert means also outputs to the automatic-regeneration-allowing means 70 an alert signal showing that it is necessary to carry out automatic regeneration. In a state of input of an alert signal (during the period in which the filter regenerating means 65 is outputting an alert signal), upon receiving from the automatic-regeneration-allowing switch 301 a command allowing automatic regeneration to be carried out, the automatic-regeneration-allowing means 70 then allows the filter regenerating means 65 to carry out automatic regeneration.

When the regeneration alert LED display section 202a is alerted, the operator depresses the automatic-regeneration-allowing switch 301 and outputs a signal to allow automatic regeneration of the DPF 13, whereupon the automatic-regeneration-allowing means 70 switches from an automatic regeneration flag showing that automatic regeneration is disallowed, to an automatic regeneration flag showing that automatic regeneration is allowed. The filter regenerating means 65 refers to the automatic regeneration flag of the automatic-regeneration-allowing means 70, and upon detecting that automatic regeneration is allowed, executes the remaining second regeneration step.

In the present embodiment, the automatic-regeneration-allowing means 70 has a flag that always disallows automatic regeneration at startup of the filter regenerating means 65. Specifically, upon startup of the controller 60, when the diesel engine 3 is started, automatic regeneration is disallowed by the automatic-regeneration-allowing means 70. By always disallowing automatic regeneration when the diesel engine 3 is started in this manner, automatic regeneration does not begin unless allowed by the operator. In so doing, situations in which automatic regeneration begins and the exhaust temperature becomes very high before the operator is aware of it can be avoided.

The alerting means is not limited to automatic regeneration as mentioned previously, and during parked regeneration carried out by the filter regenerating means 65 as well, once the accumulated amount of particulate matter exceeds the second accumulated amount, outputs a signal showing that it is necessary to carry out parked regeneration. In more specific terms, when the accumulated amount of particulate matter exceeds the second accumulated amount, the alerting means outputs to the parked regeneration request LED display section 202b a signal (alert) showing that it is necessary to carry out parked regeneration. Even when the exhaust temperature has not risen sufficiently and is less than 250° C., the alerting means for alerting that it is necessary to carry out automatic regeneration or parked regeneration outputs a signal to the engine-speed-increase-request LED display section 202c, and requests a rise in engine speed.

While the parked regeneration request LED display section 202b is performing an alert, the operator meets a parked pretequisite of the tractor 1, such as putting it into neutral, putting the diesel engine 3 into an idling state, locking the parking brake, or turning off the PTO switch. The operator then depresses the parked regeneration allowing switch 302, and outputs a signal allowing parked regeneration of the DPF 13, whereupon the parked regeneration initiating means 71 initiates parked regeneration, and notifies the filter regenerating means 65 that parked regeneration has been initiated.

Upon receipt of notification, the filter regenerating means 65 performs regeneration of the DPF 13, starting from the first regeneration step when the acquired exhaust temperature is less than a predetermined temperature (for example, 250° C.), or starting from the second regeneration step when the acquired exhaust temperature is equal to or greater than the predetermined temperature. In this way, initiation of parked regeneration of the DPF 13 is commanded by the operator, only after the PM accumulated amount of the DPF 13 has exceeded the second accumulated amount.

In the above manner, DPF 13 regeneration according to the present embodiment has the feature that automatic regeneration is not initiated unless so allowed by the automatic-regeneration-allowing means 70. As has been mentioned previously, DPF 13 regeneration according to the present embodiment is realized by the diesel engine 3 of the tractor 1, the controller 60, the display device 9, and the automaticregeneration-allowing switch 301 and the parked regeneration initiation switch 302 which are furnished at the perimeter of the display device 9, under command by the operator via the automatic-regeneration-allowing switch 301 and the parked regeneration initiation switch 302.

Figure 3:
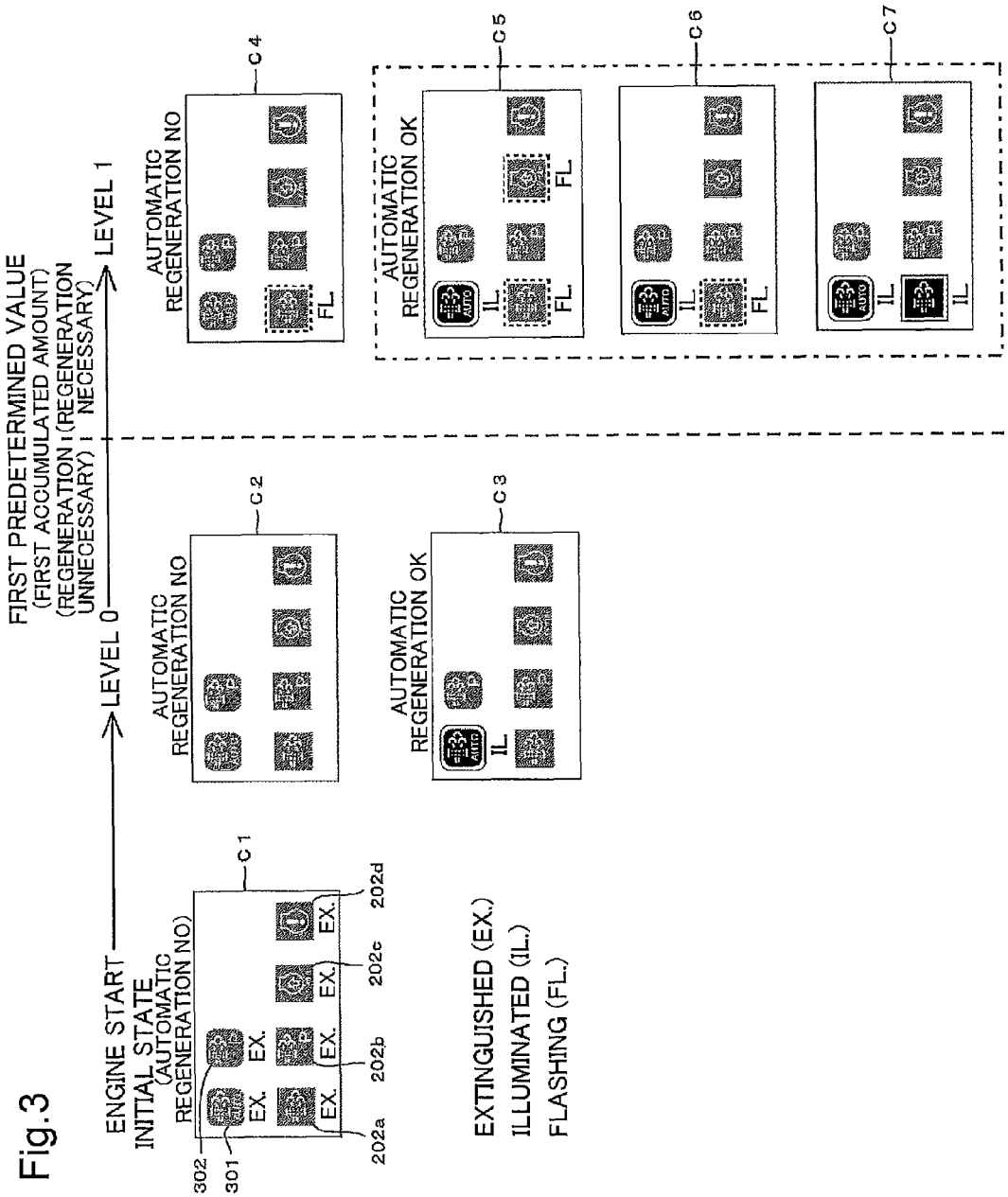
FIG. 3 is a drawing representing transitions between displays of a display device, an automatic-regeneration-allowing switch, and a parked regeneration initiation switch, in association with change in the accumulated amount of particulate matter.
Figure 4:
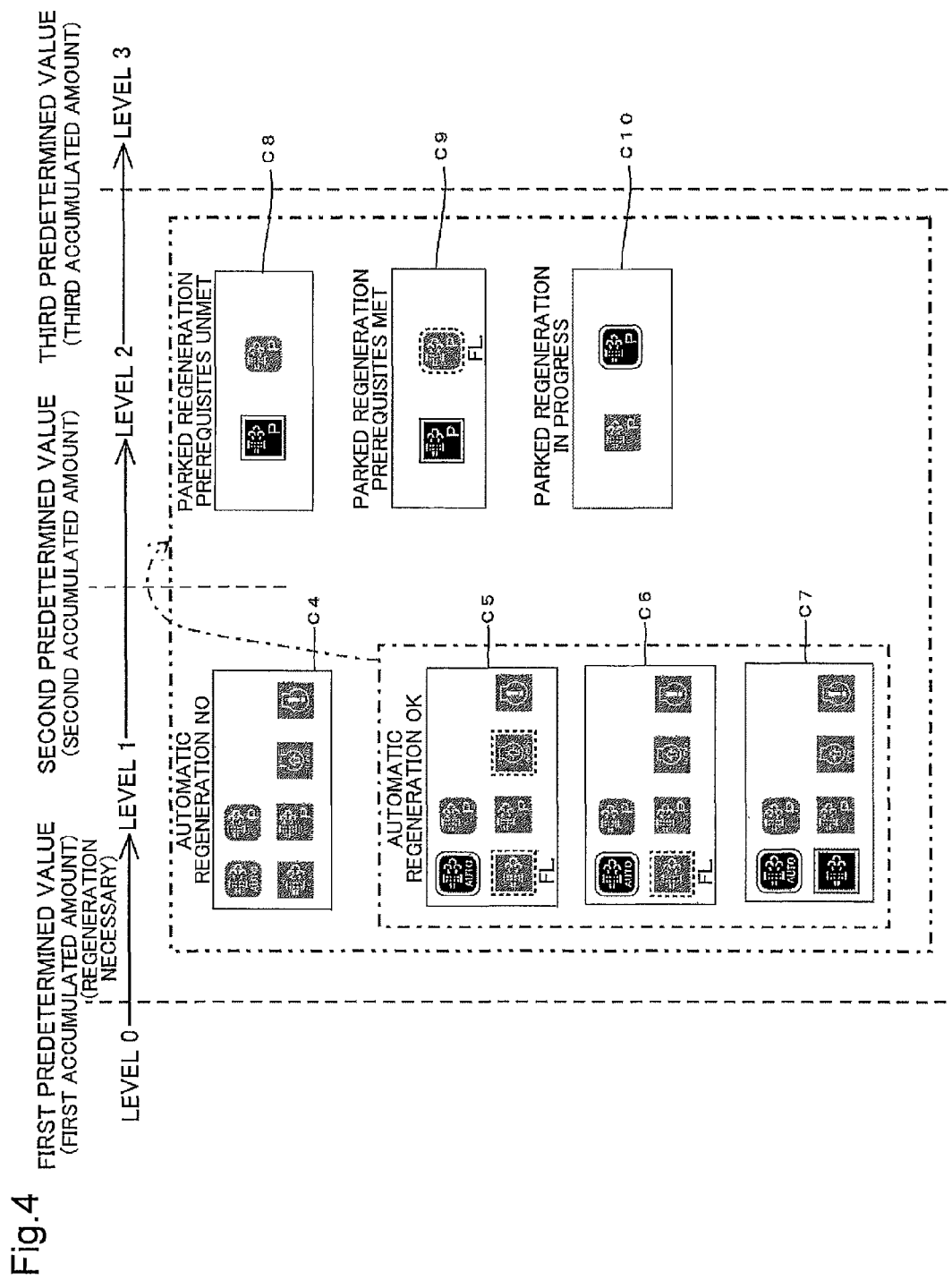
FIG. 4 is a drawing representing transitions between displays of a display device, an automatic-regeneration-allowing switch, and a parked regeneration initiation switch, in association with change in the accumulated amount of particulate matter.
Figure 5:
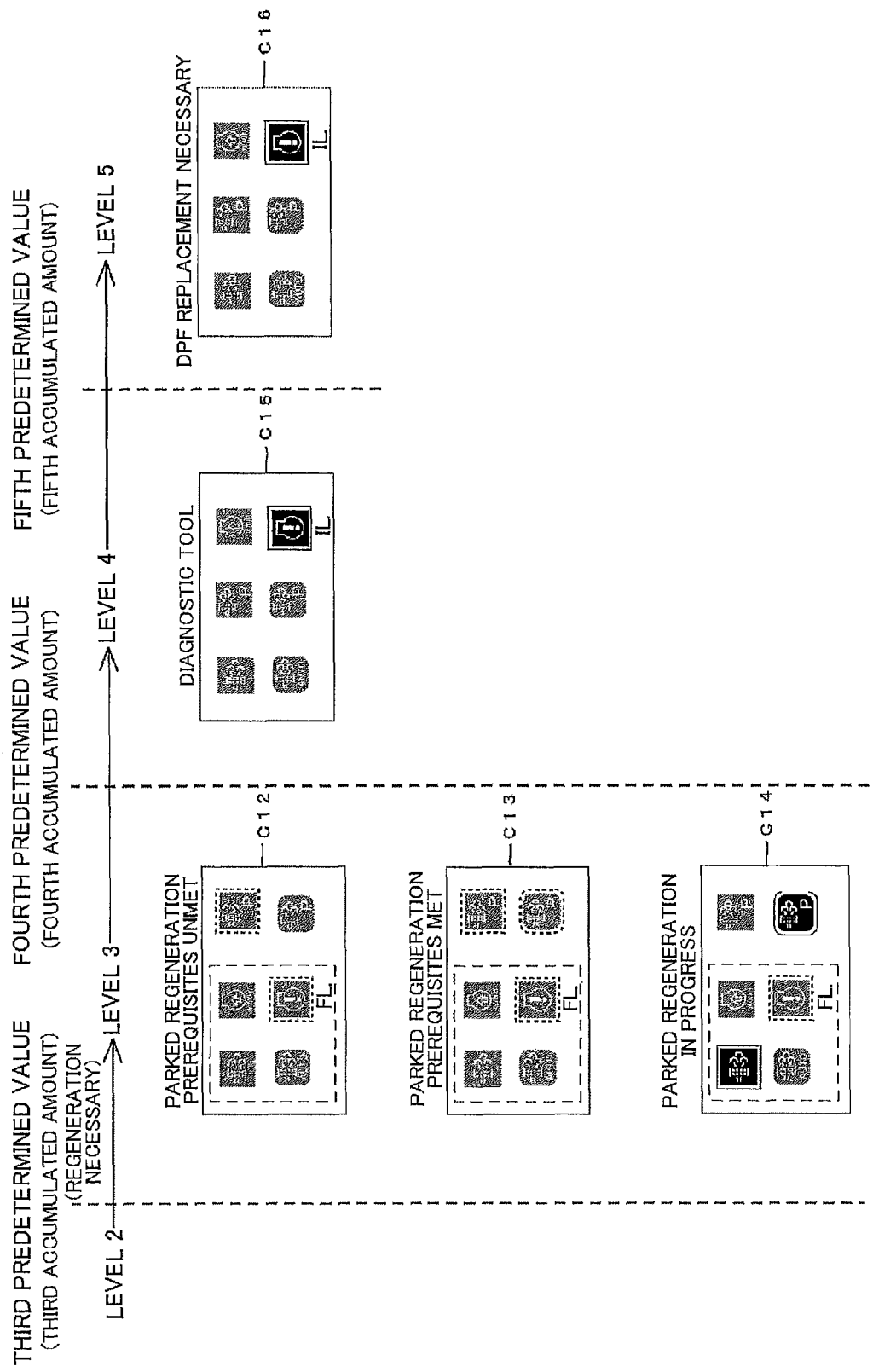
FIG. 5 is a drawing representing transitions between displays of a display device, an automatic-regeneration-allowing switch, and an parked regeneration initiation switch, in association with change in the accumulated amount of particulate matter.

Automatic regeneration and parked regeneration in the present embodiment are now described in detail while referring to FIGS. 3 to 5. FIGS. 3 to 5 are drawings describing the procedure of regenerating the DPF 13 according to the present embodiment, in terms of the states of the automatic regeneration alert LED display section 202a, the parked regeneration request LED display section 202b, the engine-speed-increase-request LED display section 202c, the contact dealer alert LED display section 202d, the automatic-regeneration-allowing switch 301, and the parked regeneration initiation switch 302.

FIG. 3 shows a hypothetical case in which the PM accumulated amount has gradually increased since immediately after starting the diesel engine 3. It is assumed that, immediately after starting the diesel engine 3, the PM accumulated amount in the DPF 13 is less than the first accumulated amount (level 0) at which regeneration of the DPF 13 is unnecessary. Here, as mentioned previously, the first accumulated amount is about 40% of the capacity of the DPF 13.

Case C1 shown in FIG. 3 shows an initial state immediately after starting the diesel engine 3. Immediately after starting the diesel engine 3, the automatic-regeneration-allowing means 70 is in an initial state in which automatic regeneration is disallowed, and the automatic-regeneration-allowing switch 301 is extinguished. The PM accumulated amount is less than the first accumulated amount, and the parked regeneration initiation switch 302 is extinguished as well. Additionally, because the PM accumulated amount is less than the first accumulated amount, the automatic regeneration alert LED display section 202a, the parked regeneration request LED display section 202b, the engine-speed-increase-request LED display section 202c, and the contact dealer alert LED display section 202d are extinguished as well.

In FIGS. 3 to 5, switches and LED display sections in extinguished states are represented in grayscale, while those in flashing states are depicted as bordered by a broken line, illuminated states are denoted in black, bordered by a solid line.

In a case in which, after starting the diesel engine 3, the tractor 1 enters, for example, an area of dry brush, a livestock shed, or other place where would be undesirable for automatic regeneration to begin regardless of the operator's intention, unless the operator depresses the automatic-regeneration-allowing switch 301, automatic regeneration remains disallowed (prohibited) in the automatic-regeneration-allowing means 70, and none of the switches or LED display sections are steady lit or flashing, as shown in case C2.

However, in a case in which the operator has decided it does not matter if automatic regeneration were to begin regardless of the operator's intention, such as when working in a safe cultivated area or the like, the operator depresses the automatic-regeneration-allowing switch 301, whereupon as shown in case C3, the automatic-regeneration-allowing switch 301 changes from extinguished to illuminated, and an allow signal that allows automatic regeneration can be output in advance to the automatic-regeneration-allowing means 70, despite the PM accumulated amount being less than the first accumulated amount. Based on the output allow signal, the automatic-regeneration-allowing means 70 switches the automatic regeneration flag which disallowed automatic regeneration, to now allow it. Once the PM accumulated amount increases to equal to the first accumulated amount or greater, the filter regenerating means 65 can perform automatic regeneration whenever regeneration of the DPF becomes necessary.

In a case in which the tractor 1 has now begun working, and the PM accumulated amount in the DPF 13 has exceeded the first accumulated amount, regeneration control enters level 1, whereupon, as shown in case C4, even when the automatic-regeneration-allowing switch 301 has not been depressed, the automatic regeneration alert LED display section 202a flashes. This flashing of the automatic regeneration alert LED display section 202a shows that the second regeneration step of automatic regeneration has not been executed, or that automatic regeneration is currently disallowed. At the point in time that the PM accumulated amount reaches level 1, the filter regenerating means 65 initiates the first regeneration step, which involves constricting the intake throttle of the diesel engine 3 in order to increase the exhaust temperature to approximately 250° C.

At this time, in a case in which the operator has noticed that the automatic regeneration alert LED display section 202a is flashing, and has depressed the automatic-regeneration-allowing switch 301, or in a case in which the operator has previously depressed the automatic-regeneration-allowing switch 301 while at level 0, any of the displays shown in case C5 to case C7 will be displayed. Firstly, case C5 shows a case in which, despite the PM accumulated amount having exceeded the first accumulated amount, and the automatic-regeneration-allowing switch 301 having been depressed, the exhaust temperature is not yet sufficiently high (up to approximately 250° C.). In case C5, the depressed automatic-regeneration-allowing switch 301 is steady lit; the automatic regeneration alert LED display section 202a flashes, showing that the second regeneration step has not been executed; and additionally, the engine-speed-increase-request LED display section 202c flashes, so as to prompt for a rise in engine speed in order to bring about a rise in the exhaust temperature.

While the filter regenerating means 65 initiates the first regeneration step at the point in time that the PM accumulated amount has reached level 1, because simply constricting the intake throttle will not always bring about a rise in exhaust temperature within a short time, there may arise a case such as case C5, in which a rise in engine speed is requested by the alert means mentioned previously.

Here, when the automatic-regeneration-allowing switch 301 is depressed again and automatic regeneration is disallowed, the display of case C5 will revert to that of case C4.

Next, case C6 shows a case in which the operator has received the request of case C5, and has manually operated the hand accelerator or the foot accelerator of the tractor 1 to raise the engine speed to a predetermined speed or higher. In case C6, while the exhaust temperature has not yet risen sufficiently (up to approximately 250° C.), the engine speed has reached a predetermined speed or higher, and therefore the exhaust temperature will rise after some time has elapsed; therefore, the engine-speed-increase-request LED display section 202c is extinguished.

However, when the engine speed is less than the predetermined speed before the exhaust temperature rises sufficiently (up to approximately 250° C.), the exhaust temperature does not rise to the point that the second regeneration step can be carried out, and therefore the display of case C6 reverts to that of case C5.

Next, case C7 shows a case in which, after the exhaust temperature has risen sufficiently, the filter regeneration control means of the filter regenerating means 65 has initiated the second regeneration step. In case C7, post-injection is performed by carrying out the second regeneration step, and therefore the automatic regeneration alert LED display section 202a, which in case C6 was flashing, now changes to illuminated, letting the operator know that post-injection is being carried out.

In this way, at level 1, flashing of the automatic regeneration alert LED display section 202a presents the operator with very important information, and shows either of two states, depending on whether the automatic-regeneration-allowing switch 301 is illuminated or extinguished. The first of these is a case in which the automatic-regeneration-allowing switch 301 is extinguished, and shows that while automatic regeneration is disallowed, the PM accumulated amount is increasing to a level at which automatic regeneration will be necessary. The second is a case in which the automatic-regeneration-allowing switch 301 is illuminated, showing that while automatic regeneration is allowed, the second regeneration step has yet to be executed, and the exhaust temperature has yet to reach high temperature.

At level 1, even after the automatic-regeneration-allowing switch 301 is illuminated and automatic regeneration has been allowed, the operator can depress the automatic-regeneration-allowing switch 301 again to extinguish the automatic-regeneration-allowing switch 301, and again disallow automatic regeneration. Specifically, the automatic-regeneration-allowing switch 301 outputs a command to allow automatic regeneration to be carried out, and outputs a command whereby automatic regeneration, once allowed to be carried out, is disallowed. Even in a case in which the second regeneration step has been executed previously, and the DPF 13 and the exhaust gases are at very high temperature, by again disallowing automatic regeneration, the second regeneration step can be halted, and the temperature of the DPF 13 and the exhaust gases can be lowered. After the temperature of the DPF 13 and the exhaust gases has been sufficiently lowered, the operator can then enter into a dry brush area or livestock shed with the tractor 1.

However, in a case in which automatic regeneration has not been allowed in level 1, or in a case in which the particulate matter was not sufficiently combusted by automatic regeneration, the PM accumulated amount will increase further. In such cases, when the accumulated amount acquiring means 63 of the filter regenerating means 65 detects that the PM accumulated amount in the DPF 13 has exceeded the second accumulated amount (for example, 60% of the capacity of the DPF 13), regeneration control by the filter regenerating means 65 transitions to level 2.

As shown in FIG. 4, in level 2, the filter regenerating means 65 steady-lights the parked regeneration request LED display section 202b, to alert that the PM accumulated amount is such that parked regeneration is necessary.

In parked regeneration, engine speed is forcibly increased in order to raise the exhaust temperature, and therefore, to carry out parked regeneration, it is necessary for the tractor 1 to be reliably parked. As mentioned previously, prerequisites whereby it can be verified that the tractor 1 is parked include having been put into neutral, the diesel engine 3 having been placed in a idling state, the parking brake having been locked, the PTO switch having been turned off, or other events (hereinafter termed parked regeneration prerequisites).

In level 2, once parked regeneration prerequisites are in place, the parked regeneration initiation switch 302 can be depressed to command the filter regenerating means 65 to initiate parked regeneration.

Case C8 shows a case in which the PM accumulated amount has exceeded the second accumulated amount. While the parked regeneration request LED display section 202b, which indicates the PM accumulated amount is such that parked regeneration is necessary, is illuminated, parked regeneration prerequisites are not in place, and therefore the parked regeneration initiation switch 302 is extinguished. Specifically, a state in which parked regeneration is necessary, but parked regeneration cannot be initiated because the parked regeneration initiation switch 302 is extinguished, is shown.

Next, once parked regeneration prerequisites are in place, a state like that shown in case C9, in which the parked regeneration request LED display section 202b is illuminated, the parked regeneration initiation switch 302 is flashing, and regeneration prerequisites are in place, making parked regeneration possible, is entered.

Here, when the operator depresses the parked regeneration initiation switch 302, the parked regeneration initiation switch 302 changes from flashing to illuminated, as shown in case C10. Depressing the parked regeneration initiation switch 302 commands the filter regenerating means 65 to initiate parked regeneration, and upon receiving the command, the filter regenerating means 65 initiates parked regeneration. Once parked regeneration is initiated, the parked regeneration request LED display section 202b is extinguished.

As shown in FIG. 4, in level 2, there is some leeway as to the PM accumulated amount in proportion to the trapping capacity of the DPF 13, and therefore it is not always necessary for the DPF 13 to be regenerated by parked regeneration. Level 2 is a level in which both automatic regeneration and parked regeneration are possible, with the operator being able to determine which to carry out, as appropriate.

Next, when the PM accumulated amount in the DPF 13 increases further, and the accumulated amount acquiring means 63 of the filter regenerating means 65 detects that the PM accumulated amount in the DPF 13 has exceeded a third accumulated amount (for example, 80% of the capacity of the DPF 13), DPF regeneration control by the filter regenerating means 65 transitions to level 3.

In level 3, as shown by cases C12 and C13, the filter regenerating means 65 flashes the parked regeneration request LED display section 202b, to urgently request the operator to carry out parked regeneration. Moreover, by flashing the contact dealer alert LED display section 202d, the filter regenerating means 65 alerts the operator that failing to carry out parked regeneration at this level 3 will result in the PM accumulated amount increasing to the point that the DPF 13 can no longer be regenerated, making necessary repair work at the maintenance shop.

At level 3, the filter regenerating means 65 extinguishes the automatic-regeneration-allowing switch 301, disallowing automatic regeneration. Thereafter, even if the automatic-regeneration-allowing switch 301 is depressed and a command to allow automatic regeneration is sent to the filter regenerating means, the filter regenerating means does not accept the allow command.

At this time, when the operator has not put parked regeneration prerequisites in place, the filter regenerating means 65 performs the display shown in case C12; or when parked regeneration prerequisites are in place, flashes the parked regeneration initiation switch 302, as shown in case C13.

Once the operator receives the display of case C13 and depresses the parked regeneration initiation switch 302, the parked regeneration initiation switch 302 changes from flashing to illuminated, as shown in case C14. By depressing the parked regeneration initiation switch 302, the filter regenerating means 65 is commanded to initiate parked regeneration, and upon receiving the command, the filter regenerating means 65 initiates parked regeneration. Once parked regeneration is initiated, the parked regeneration request LED display section 202b is extinguished. In case C14, once the filter regenerating means 65 initiates post-injection by carrying out the second regeneration step, the automatic regeneration alert LED display section 202a is illuminated, alerting the operator that post-injection is being carried out.

At level 3, when, due to operator failure to carry out parked regeneration, the PM accumulated amount in the DPF 13 increases still further, and the accumulated amount acquiring means 63 of the filter regenerating means 65 detects that the PM accumulated amount in the DPF 13 has exceeded a fourth accumulated amount (for example, 95% of the capacity of the DPF 13), DPF regeneration control by the filter regenerating means 65 transitions to level 4.

At level 4, the filter regenerating means 65 cannot perform regeneration of the DPF 13. Therefore, the filter regenerating means 65 changes the contact dealer alert LED display section 202d from flashing to illuminated, to request the operator for repair work at the maintenance shop. Consequently, at level 4, the filter regenerating means 65 performs the display shown in case C15.

At level 4, when the PM accumulated amount in the DPF 13 has increased to the upper limit of its trapping capacity due to failure to perform repair work, and the accumulated amount acquiring means 63 of the filter regenerating means 65 detects that the PM accumulated amount in the DPF 13 has exceeded a fifth accumulated amount (for example, 99% of the capacity of the DPF 13), DPF regeneration control by the filter regenerating means 65 transitions to level 5. At level 5, the filter regenerating means 65 performs the display shown in case C16, which is analogous to case C15. At level 5, it will be necessary to replace the DPF 13, and the filter regenerating means 65 displays a message requesting replacement of the DPF 13, as text information or the like, on the liquid crystal panel 201 of the display device 9.

In the tractor 1 according to the present embodiment, regeneration control in level 1 to level 5 is performed in the manner discussed above, by the filter regenerating means 65. Within such regeneration control, regeneration control as in levels 1 and 2 is a particular feature of the tractor 1 according to the present embodiment. The filter regenerating means 65 always disallows automatic regeneration when the diesel engine 3 is started, and at levels 1 and 2, automatic regeneration is allowed by a command from the user.

In this way, by always disallowing automatic regeneration when the diesel engine 3 is started, automatic regeneration does not begin, unless allowed by the operator. In so doing, situations in which automatic regeneration begins and the exhaust temperature becomes very high before the operator is aware of it can be avoided.

In all respects, the embodiment disclosed hereinabove is merely exemplary and should not be construed as limiting. The scope of the present invention is shown not by the preceding description, but rather by the scope of the claims, and equivalents in meaning to the scope of the claims, as well as all modifications within the scope thereof, are intended to be included therein.

In the aforedescribed embodiment, the filter regenerating means 65 outputs to the automatic regeneration alert LED display section 202a an alert signal alerting of the necessity to perform automatic regeneration; however, an alert signal may be output to the automatic-regeneration-allowing switch 301 instead. Where the automatic-regeneration-allowing switch 301 has a light source such as an LED or the like, it can, in a manner analogous to the automatic regeneration alert LED display section 202a, alert of the necessity to perform automatic regeneration, based on the alert signal output by the filter regenerating means 65.

Moreover, in automatic regeneration according to the embodiment previously discussed, "constricting the intake throttle" was described by way of example, but automatic regeneration is not limited to only to "constricting the intake throttle," and regeneration of the DPF by post-injection of fuel may supplement automatic regeneration. Post-injection refers to an action of injecting fuel subsequent to combustion to accelerate rise in temperature of the DPF 13.

Furthermore, regeneration control as described in the present embodiment can be applied not just to the tractor 1, but to other construction machines or agricultural machines for performing work, such as a compact truck loader (CTL), tractor, or the like.

Additional Embodiments

Figure 7:
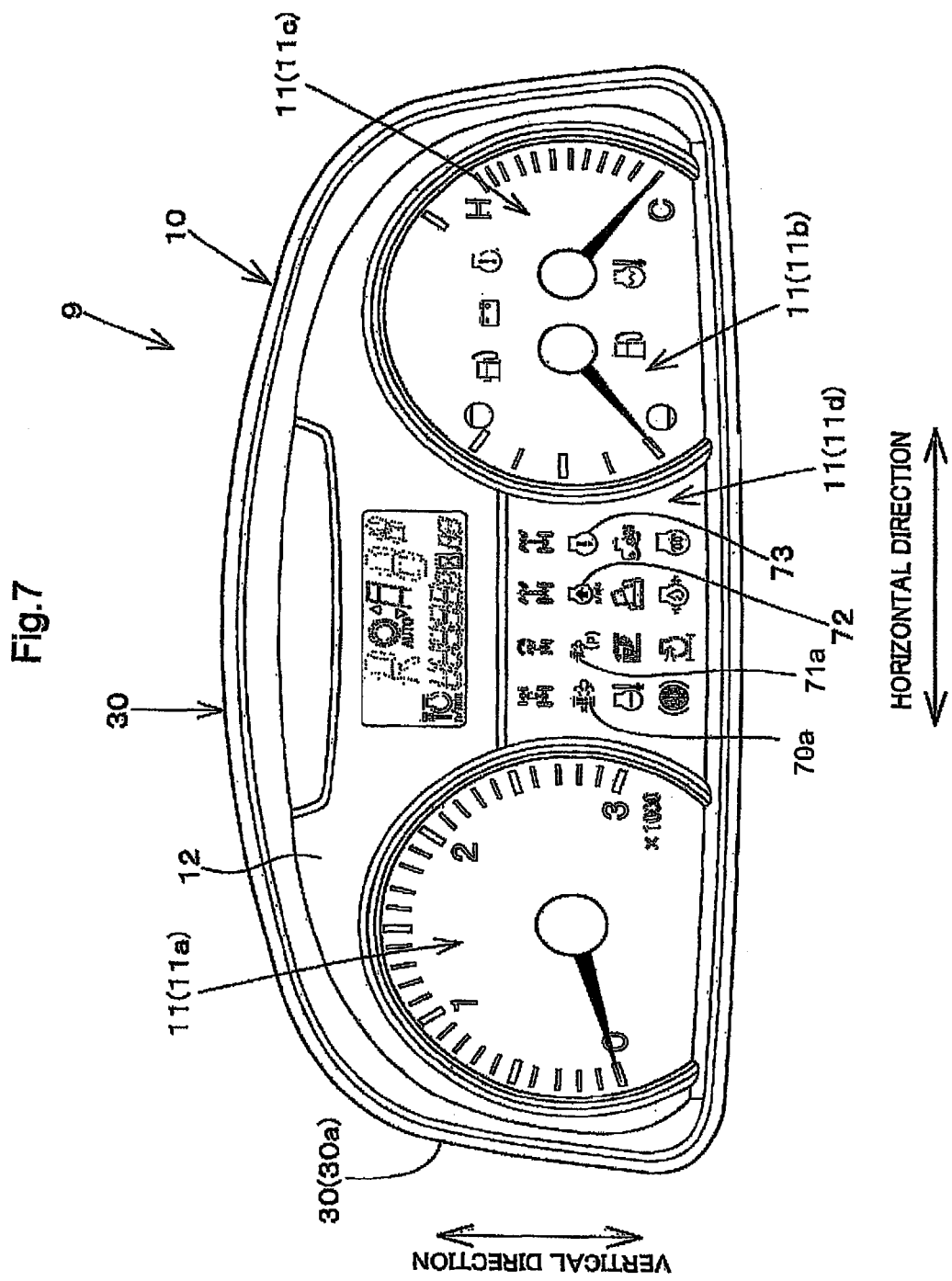
FIG. 7 is a constitution drawing of a display device.

FIG. 7 shows the constitution of the display device 9 in its entirety.

As shown in FIG. 7, the display device 9 is constituted, for example, by installing a display substrate 12 to form a display part 11 inside an outer case 10 of rectangular shape (box type).

At the left side (one side) of the display substrate 12 there is furnished an engine revolution display part 11a that displays engine speed by an indicator needle. To the right side (the other side) of the display substrate 12 there is furnished a fuel display part 11b that displays the fuel by an indicator needle, and there is also furnished a water temperature display part 11c that displays the water temperature by an indicator needle. Furthermore, in the center part in the horizontal direction of the display substrate 12, there is furnished a lamp display part 11d that displays various warnings and alerts (notifications) through lights such as LEDs or the like. Specifically, the driver seated in the driver's seat can manually operate the tractor 1 while looking at the various display parts 11 (11a, 11b, 11c, 11d) of the display device 9.

Figure 8:
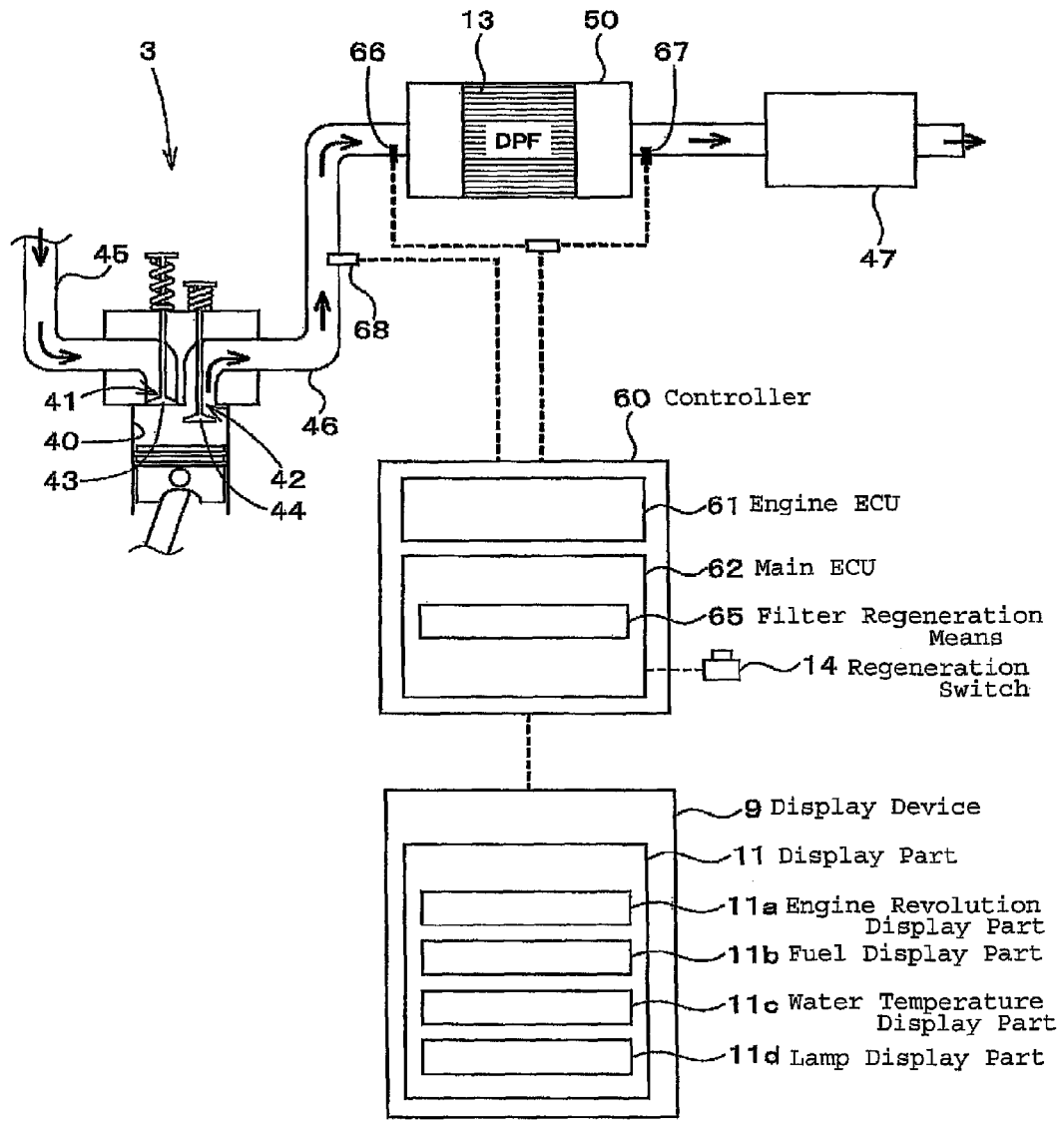
FIG. 8 is a drawing showing the constitution of a gas emission cleaning device.

As shown in FIG. 8, particulate matter included in gas emissions emitted by the diesel engine 3 is trapped by the DPF 13. The accumulated amount of particulate matter accumulated in the DPF 13 (termed the PM accumulated amount) gradually increases, and therefore it is necessary to perform cleaning to reduce the PM accumulated amount, specifically, regeneration of the DPF (also termed DPF regeneration).

In the present invention, as discussed below, the constitution is one in which DPF regeneration is performed through control by the controller 60; however, the timing for initiating DPF regeneration, or the like can be decided through the intention of the worker who is driving the tractor 1.

In the present invention, a regeneration switch 14 for commanding initiation of DPF regeneration, or the like is furnished nearby the display device 9. This regeneration switch 14 is a pushbutton type switch that incorporates an LED or the like; the regeneration switch 14 is illuminated or flashing when DPF regeneration is necessary, and when pushed, performs a command such as DPF regeneration or the like.

Figure 6:
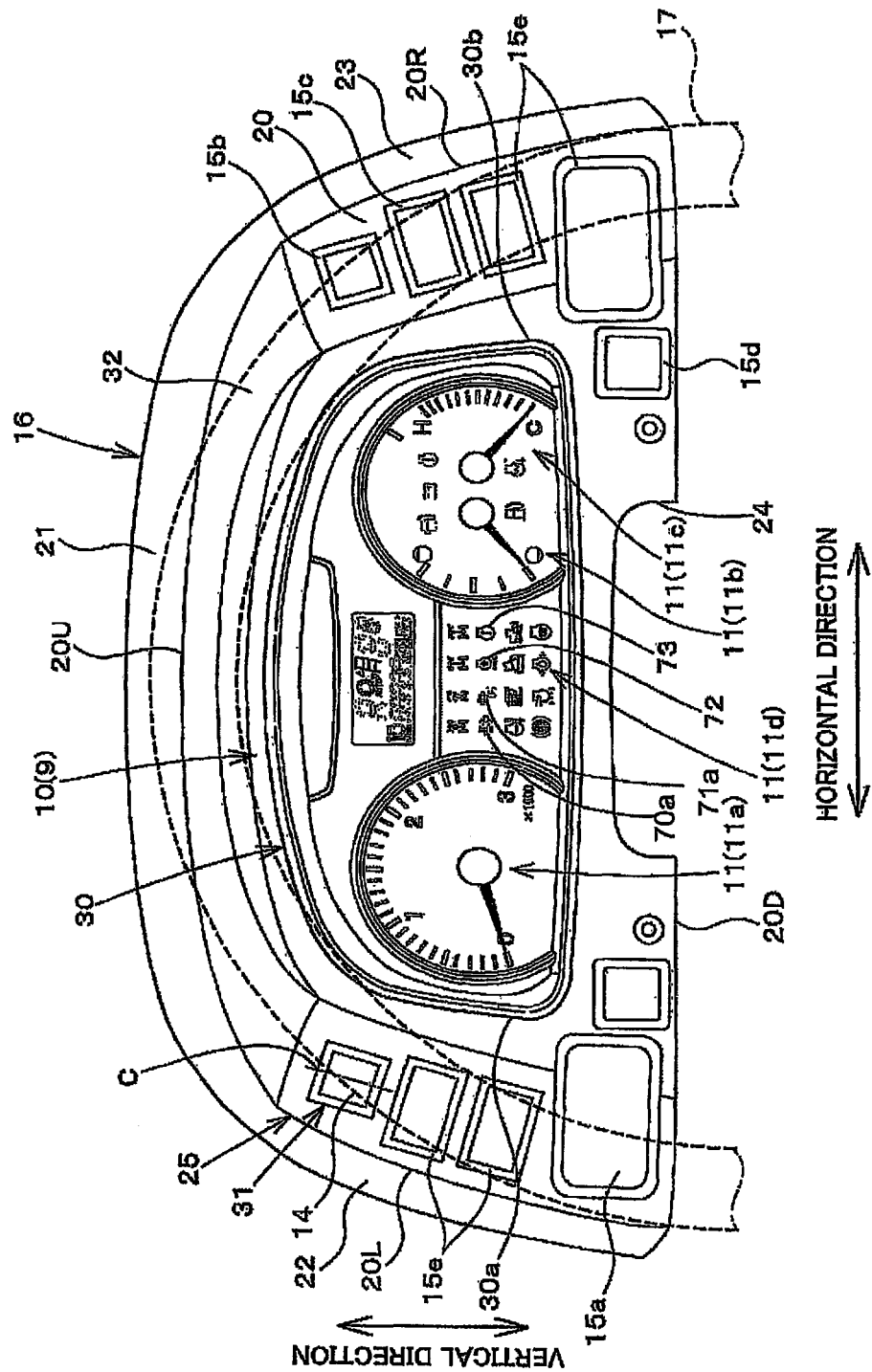
FIG. 6 is a front view of a display device seen from the driver's seat side.

FIG. 6 shows the display device 9 seen from the driver's seat 8 side. In the description of FIG. 6, for convenience, the horizontal direction of the page of FIG. 6 is described as being the horizontal direction, the vertical direction of the page of FIG. 6 as being the vertical direction, and a direction passing through the page of FIG. 6 as being the longitudinal direction.

As shown in FIG. 6, the area around the outer case 10 (the display device 9), except for the display face of the outer case 10, is covered by a display device cover 16 fastened thereto, and the regeneration switch 14 is attached to this display device cover 16.

In more specific terms, an opposed face 20 that opposes a backrest 8a of the driver's seat 8 when the display device cover 16 is viewed from the driver's seat 8 side is formed on the display device cover 16, and the regeneration switch 14 is attached onto this opposed face 20.

More specifically, when the opposed face 20 is viewed from the side of a steering wheel 17 furnished between the display device 9 and the driver's seat 8, the regeneration switch 14 is furnished in a section corresponding to one side (for example, the left side) in the horizontal direction of the steering wheel 17; for example, in a section that overlaps the steering wheel 17 in the longitudinal direction, or in a section that overlaps the interior of the arc of the steering wheel 17 in the longitudinal direction.

Moreover, when the regeneration switch 14 furnished to the opposed face 20 is viewed from the driver's seat 8 side, the regeneration switch 14 has an inclined orientation. In more detail, when the centerline C in the vertical direction of the regeneration switch 14 is viewed, this centerline C is inclined so as to transition outward in the horizontal direction going from the top side to the bottom side, giving the regeneration switch 14 an outside-inclined orientation in which the lower end transitions further towards the outside than the upper end.

Because the regeneration switch 14 is furnished inclined on the diagonal in this manner to a section that corresponds to one side of the steering wheel 17 in the horizontal direction when viewed from the steering wheel 17 side, while driving or the like, the driver can constantly verify the state of the regeneration switch 14 together with the display part 11 of the display device 9, and when conditions that call for the regeneration switch 14 to be pushed arise, can extend a hand from the side of the steering wheel 17 and easily push the regeneration switch 14. In particular, the regeneration switch 14 is easily pushed by virtue of being inclined on the diagonal.

The position of the regeneration switch 14 is described in further detail below, together with a description of the display device cover 16.

The display device cover 16 is provided with the opposed face 20 (opposed wall) that opposes the backrest 8a of the driver's seat 8; an upper face (upper wall) 21 furnished along an upper side edge part 20U of this opposed face 20 and projecting towards the front; a left side face (left side wall) 22 furnished along a left side edge part 20L of the opposed face 20 and projected out towards the front; and a right side face (right side wall) 23 furnished along a right side edge part 20R of the opposed face 20 and projected out towards the front.

The left side face 22 transitions gradually towards the center in the horizontal direction going from the bottom side to the top side, and links up with the upper face 21. The right side face 23 transitions gradually towards the center in the horizontal direction going from the bottom side to the top side, and links up with the upper face 21. The upper face 21 has a shape such that the two end parts in the horizontal direction of the upper face 21 (the portions that link up with the left side face 22 and the right side face 23) project somewhat further upward than the center part in the horizontal direction.

Stated another way, when the opposed face 20 is viewed from the driver's seat 8 side, the left side edge part 20L of the opposed face 20 transitions gradually in the horizontal direction towards the center going from the bottom end to the top end; the right side edge part 20R of the opposed face 20 transitions gradually in the horizontal direction towards the center going from the bottom end to the top end; and at the upper side edge part 20U of the opposed face 20, the center part thereof in the horizontal direction transitions somewhat further upward than do the two end parts of the upper side edge part 20U in the horizontal direction (the portions that link up with the left side edge part 20L and the right side edge part 20R).

Specifically, the left side edge part 20L, the right side edge part 20R, the upper side edge part 20U, and the lower side edge part 20D constitute a peripheral edge part 25 of the opposed face 20, with the upper left side of the peripheral edge part 25 (the portion that links up with the left side edge part 20L and the upper side edge part 20U) having an arcuate shape, and the upper right side of the peripheral edge part 25 (the portion that links up with the right side edge part 20R and the upper side edge part 20U) having an arcuate shape as well. Except for a cutout part 24 for insertion of a steering wheel stay, the lower side edge part 20D lies generally on a single straight line.

As shown in FIG. 6, the regeneration switch 14 is furnished between a peripheral edge part 30 of the display device 9 (the peripheral edge part 30 of the upper end of the outer case 10), and the peripheral edge part 25 of the opposed face 20 mentioned above.

In more detail, a mounting part 31 for the purpose of furnishing the regeneration switch 14 is furnished between a first left/right edge part 30a formed to one side (the left side) in the horizontal direction of the peripheral edge part 30 of the upper end of the outer case 10, and the left side edge part 20L (second left/right edge part) which is formed to the left side (one side) in the horizontal direction of the opposed face 20, on the peripheral edge part 25 of the opposed face 20. The regeneration switch 14 is furnished to this mounting part 31. In more specific terms, there is furnished a mounting part 31 constituted by a through-hole, a recess, or the like, for mounting the regeneration switch 14 onto the opposed face 20, and the regeneration switch 14 is furnished to this mounting part 31.

In even greater detail, the mounting part 31 is furnished at a position that corresponds to the upper side of the display part 11 of the display device 9, between the first left/right edge part 30a and the second first left/right edge part 20L, and the regeneration switch 14 is furnished to this mounting part 31. Stated another way, the regeneration switch 14 is furnished at a location that is uppermost in the vertical direction, among the plurality of switches furnished to the opposed face 20.

In this way, because the regeneration switch 14 is furnished between the first left/right edge part 30a formed to the left side (one side) in the peripheral edge part 30 of the display device 9, and the left side edge part 20L (second left/right edge part) which has been formed to the left side (one side) in the peripheral edge part 25 of the opposed face 20, the regeneration switch 14 is disposed close to (nearby) the left side of the display device 9, and the state of the regeneration switch 14 can be verified together with that of the display part 11 of the display device 9, in a manner comparable to the regeneration switch 14 being disposed on the display part 11 of the display device 9, and visibility and manual operability of the regeneration switch 14 can be improved. In particular, visibility and manual operability can be improved by disposing the regeneration switch 14 to the upper side, when viewed from the display device 9.

Light-blocking means (shade means) 32 for darkening the area around the regeneration switch 14 to make it easier to see when illuminated or flashing is furnished nearby the regeneration switch 14. This light-blocking means 32 is constituted, for example, by an eave part formed by protruding, towards the driver's seat 9 side (the back side), the opposed face 20 positioned to the upper side of the regeneration switch 14, the extent of protrusion of this eave part 32 being set so as to darken the section of the regeneration switch 14. The light-blocking means 32 may be constituted to darken the area around the regeneration switch 14, by imparting a recessed shape to the mounting part 31 where the regeneration switch 14 is disposed, and then when inserting the regeneration switch 14 into the recessed mounting part 31, positioning the upper edge part of the regeneration switch 14 to the lower side from the opposed face 20.

By furnishing the area around the regeneration switch 14 with light-blocking means 32 in this way, the state of the regeneration switch 14 when illuminated or flashing can be easily verified.

As shown in FIG. 6, besides the regeneration switch 14, the opposed face 20 is furnished with a meter switchover switch 15a for switching over the display of the liquid crystal section furnished to the display part 11; a front defog switch 15b; a DT/double speed switch 15c; a hazard switch 15d; a standby switch 15e; and the like. When the opposed face 20 is viewed, the layout of the switches 14 and 15a to 15e defines a shape substantially like a chevron that transitions towards the outside in the horizontal direction going from the upper side to the lower side. The regeneration switch 14 is disposed at the uppermost position to the upper side of the standby switch 15e, among the switches 15a and 15e laid out at the left side.

Figure 10:
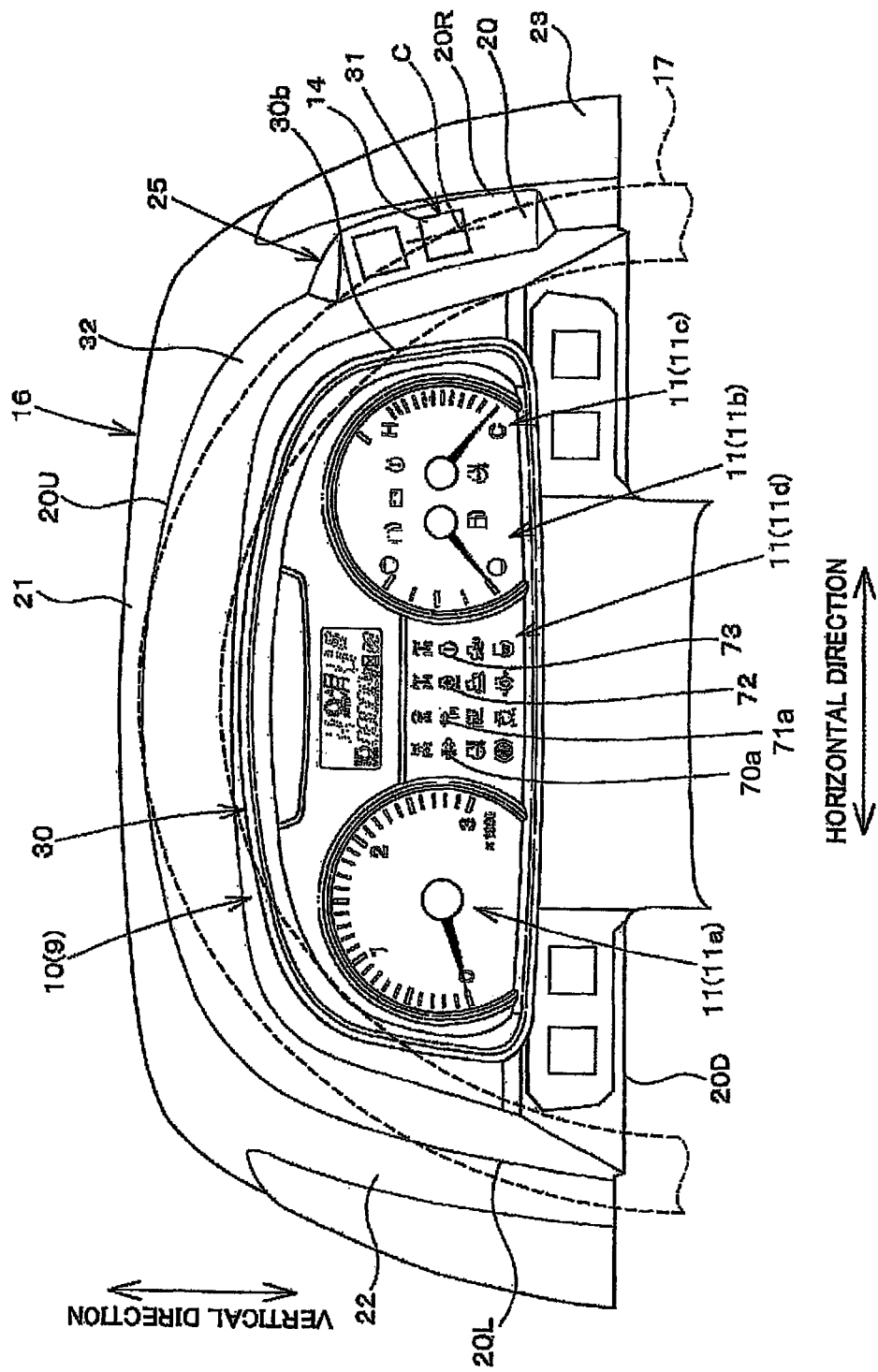
FIG. 10 is a front view of a modification of a display device seen from the driver's seat side.

In the embodiment discussed above, the regeneration switch 14 is furnished at the left side in the horizontal direction; however, as in the modification example shown in FIG. 10, it is acceptable for the regeneration switch 14 to be furnished between the first left/right edge part 30b that is formed at the right side of the peripheral edge part 30 of the display device 9, and the right side edge part 20R (second left/right edge part) that is formed at the right side of the peripheral edge part 25 of the opposed face 20.

Next, DPF regeneration is described in detail.

FIG. 8 shows the structure of an exhaust system in a diesel engine 3, the exhaust system being furnished with a DPF 13. Ordinarily, the diesel engine 3 is a multi-cylinder engine having a plurality of cylinders; in FIG. 8, however, one cylinder from among these is shown.

As shown in FIG. 8, in the upper part of the cylinder 40 of the diesel engine (hereinafter termed the engine) 3, there is formed an intake port 41 which is an opening for air to be drawn into the cylinder 40, and there is also formed an exhaust port 42 which is an opening for emitting gases subsequent to combustion (combustion gases) from the cylinder 40. The upper part of the cylinder 40 is further furnished with an intake valve 43 for opening and closing the intake port 41, and an exhaust valve 44 for opening and closing the exhaust port 42.

An intake manifold 45 of tube shape serving as a flow channel for air to be drawn into the cylinder 40 is connected to the intake port 41. An exhaust manifold 46 of tube shape serving as a flow channel for combustion gases emitted from the cylinder 40 is connected to the exhaust port 42. A silencer 47 for the purpose of reducing exhaust noise is furnished to the end of the exhaust manifold 46, and the combustion gases pass through the silencer 47 and are emitted to the outside.

In the exhaust manifold 46, a gas emission cleaning device 50 is furnished between the exhaust port 42 and the silencer 47. The gas emission cleaning device 50 cleans the gas emissions passing through it, by trapping the particulate matter included therein. Specifically, the combustion gases emitted from the cylinder 40 through the exhaust port 42 pass in the form of gas emissions through exhaust manifold 46, and are cleaned by the gas emission cleaning device 50 before reaching the silencer 47.

This gas emission cleaning device 50 has the DPF 13 inside it. The DPF 13 is formed, for example, so as to have a cross section of honeycomb structure made of ceramic. Specifically, from one end of the DPF 13 to the other along the lengthwise direction, there are adjacently situated a multitude of polygonal through-holes of hexagonal columnar straw shape, for example; and within the through-holes, porous cross walls are furnished at predetermined spacing along the lengthwise direction of the DPF 13.

The gas emissions having entered from one end side (the entry side) of the DPF 13 flow towards the other end side (the exit side) of the DPF 13 while passing through the porous cross walls formed in the through-holes. The particulate matter included in the gas emissions is trapped in the DPF 13 by becoming deposited on the porous cross walls, or deposited on the inner walls of the through-holes, and the exhaust gases that are released to the outside have been cleaned by the DPF 13. While not illustrated in the drawing, the exhaust system of the diesel engine 3 is furnished with an oxidation catalyst (diesel oxidation catalyst) or the like, for oxidizing fuel in the particulate matter, and oxides of nitrogen in the combustion gases.

In the tractor 1 of the present invention, DPF regeneration to reduce the accumulated amount of particulate matter (PM accumulated amount) that has accumulated in the DPF 13 is performed under control by the controller 60, which is constituted by a CPU or the like.

Besides controlling DPF regeneration, the controller 60 controls the action of the entire tractor, and is constituted, for example, primarily by the engine ECU 61 that controls the engine 3, and the main ECU 62 that controls various devices on board the tractor 1 in tandem with the engine ECU 61.

The engine ECU 61 controls the injector, the common rail, the supply pump, and other components based on the amount of manual operation of the accelerator lever, the amount of manual operation of the accelerator pedal, the crank position, the cam position, or a control signal from the main ECU 62. Diesel engine control in the engine ECU 61 is identical to ordinary diesel engine control, and involves, for example, control of the injector by setting the fuel injection amount, injection timing, and other parameters; and control of the supply pump or common rail by setting the fuel injection pressure. As shall be apparent, as a worker manually operates the accelerator lever or manually operates the accelerator pedal in the tractor 1, thereby changing the amount of manual operation of the accelerator lever or the amount of manual operation of the accelerator pedal, the engine speed can be increased or decreased.

Separately from the engine ECU 61, the main ECU 62 performs control of various kinds relating to the tractor 1, and has priority over control of engine revolution by the engine ECU 61, in performing control to set the engine speed.

For example, an upper limit value of engine revolution, set by a volume furnished around the driver's seat 8, is input to the main ECU 62, and in a case in which the command value for engine speed by the accelerator lever or the accelerator pedal exceeds the upper limit value of engine revolution, the main ECU 62 outputs to the engine ECU 61 a command so that the engine speed does not exceed the upper limit value of engine revolution, and performs control of engine speed with priority over the engine ECU 61. Besides this, the main ECU 62 controls lifting and lowering of the three point link mechanism 5, and the like based on a manual operation lever furnished around the driver's seat 8, as well as performing shift control of the gearshift, and the like.

Control of DPF regeneration is performed primarily by the filter regenerating means 65 which is furnished to the main ECU 62. The filter regenerating means 65 is constituted by a control program or the like stored by the main ECU 62. When the accumulated amount of particulate matter (PM accumulated amount) that has accumulated in the DPF 12 is equal to or greater than a predetermined value (equal to or greater than a threshold value), the filter regenerating means 65 outputs a command to the engine ECU 61 or another component to combust and eliminate the particulate matter, for example.

Here, the PM accumulated amount is estimated from the differential pressure between the exhaust pressure at the entry side of the DPF 13, and the exhaust pressure at the exit side of the DPF 13.

In more detail, the exhaust pressure in proximity to the entry side of the DPF 13 (the gas emission cleaning device 50) is detected by the entry-side pressure sensor 66, and the exhaust pressure in proximity to the exit side of the DPF 13 (the gas emission cleaning device 50) is detected by the exit-side pressure sensor 67. In the main ECU 61, the difference in exhaust pressure (differential pressure) between the entry side and the exit side of the gas emission cleaning device 50 is calculated from the exhaust pressure detected by the entry-side pressure sensor 66 and the exhaust pressure detected by the exit-side pressure sensor 67. When the PM accumulated amount is considerable, the differential pressure representing the difference in exhaust pressure is large, whereas when the PM accumulated amount is minimal, the differential pressure representing the difference in exhaust pressure is small, and therefore this relationship may be employed by the main ECU 62 to derive, from the calculated differential pressure, the PM accumulated amount that has accumulated in the DPF. The relationship between differential pressure and PM accumulated amount is stored in advance in the main ECU 62, in the form of a control program, control parameters, or the like. In this embodiment, the PM accumulated amount is calculated from the difference in exhaust pressure; however, there is no limitation to this, and the PM accumulated amount may instead be calculated from running time for which the engine 3 has run, the amount of fuel consumed, or the like, with any kind computation method of PM accumulated amount being acceptable.

Figure 9:
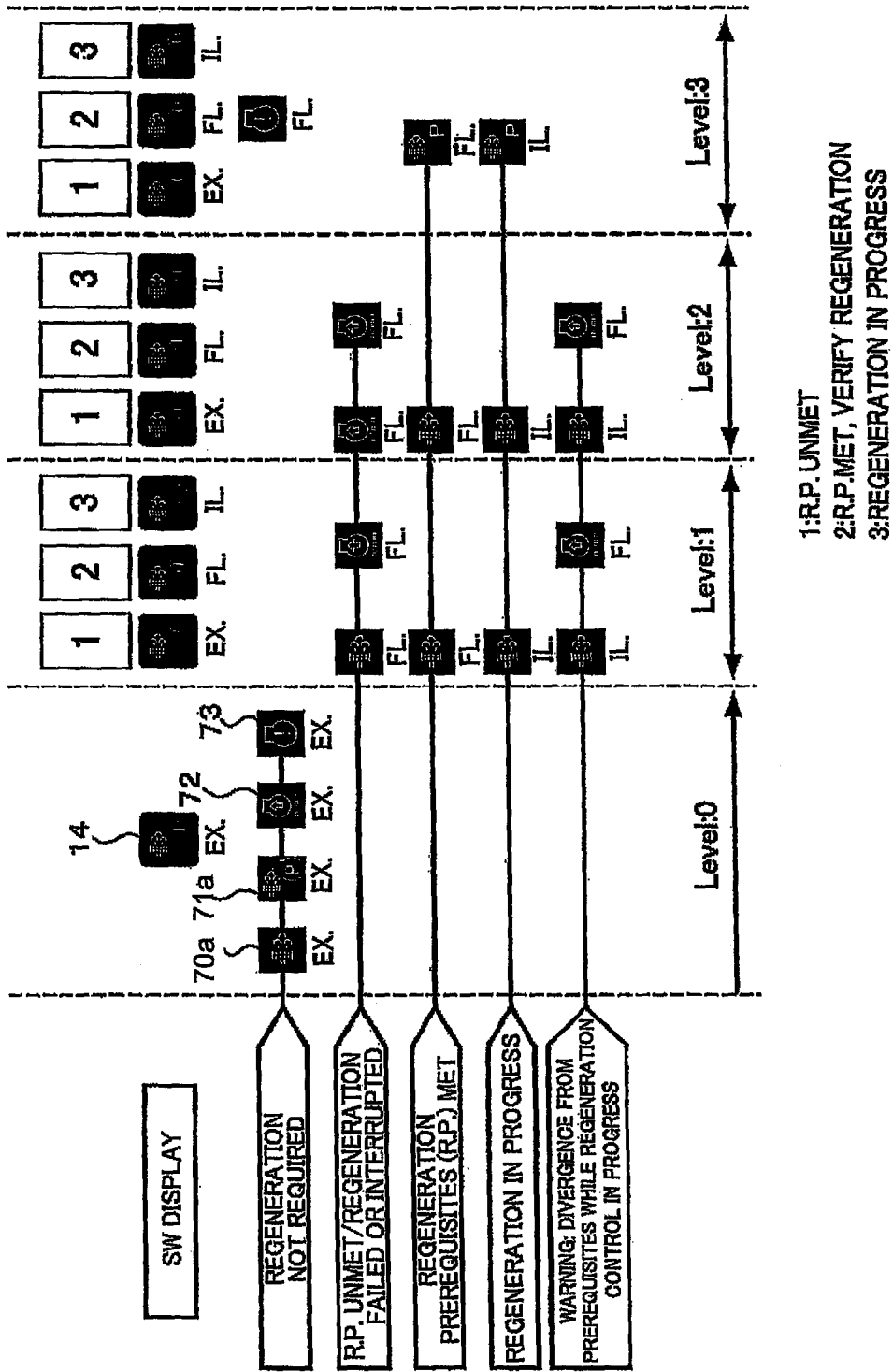
FIG. 9 is a relationship drawing of a regeneration switch and lamps relating to a DPF, and the level of DPF regeneration depending on the accumulated amount of PM.

FIG. 9 shows lamps and a regeneration switch relating to a DPF, and levels of DPF regeneration depending on the PM accumulated amount. FIGS. 7 and 9 will be employed to describe the details of DPF regeneration. A first lamp 70a, a second lamp 71a, a third lamp 72, and a fourth lamp 73 are furnished to a lamp display part 11d.

As shown in FIGS. 7 and 9, the first lamp 70a shows the state of DPF regeneration by being illuminated, flashing, or extinguished: when extinguished, this shows that DPF regeneration is unnecessary; when illuminated, this shows that DPF regeneration is currently being performed; and when flashing, this shows other various states.

The second lamp 71a is constituted like the first lamp 70a but with a "P", showing Park, applied thereto, so as to be recognizably distinguishable from the first lamp 70a. This second lamp 71a includes information for parking and performing DPF regeneration, by virtue of being illuminated, flashing, or extinguished: when extinguished, this shows that DPF regeneration is unnecessary; when illuminated, this shows that DPF regeneration is currently being performed in a parked state; and when flashing, this shows various states relating to parking and DPF regeneration.

The third lamp 72 differs from the first lamp 70a and the second lamp 71a in that it prompts a worker to raise the engine speed by manual operation of the accelerator lever or the like. When extinguished, this shows that it is unnecessary to raise engine speed; whereas when flashing, this shows prompting to raise the engine speed.

The fourth lamp 73 shows a warning in relation to DPF regeneration: when extinguished, this shows that there no warning, while when illuminated or flashing, this shows that a warning has been issued.

As shown in FIG. 9, when the PM accumulated amount is at least less than a first threshold value "Level: 0," the level is such that DPF regeneration is unnecessary, and therefore the first lamp 70a to fourth lamp 73 are extinguished, as shown in the "Regeneration unnecessary state" field. Meanwhile, as shown in the "SW display" field, because DPF regeneration is unnecessary, the regeneration switch 14 is extinguished as well.

Once the PM accumulated amount reaches the first threshold value or above "Level: 1," because the current stage is one in which DPF regeneration is necessary, the filter regenerating means 65 enters semiautomatic mode.

Semiautomatic mode is a mode in which, when the PM accumulated amount reaches a predetermined value or above (for example, the first threshold value or above), heat-up of the exhaust temperature in the gas emission cleaning device 50 is performed automatically, while waiting for a command in the course of heat-up; and once the command is received, heat-up to a temperature zone that accelerates combustion is performed, to raise the exhaust temperature in step-wise fashion.

In more specific terms, upon entering semiautomatic mode, the filter regenerating means 65 outputs to the engine ECU 61, etc., a signal commanding constriction of the intake throttle, to constrict the intake throttle, and thereby performs heat-up control to heat up the exhaust temperature inside the gas emission cleaning device 50 (the exhaust temperature at the entry side of the DPF 13, specifically, the temperature inside the DPF 13), firstly, towards a first target temperature of 250° C., by way of a first stage.

After constriction of the intake throttle is performed automatically by the semiautomatic mode, a decision is performed as to whether the exhaust temperature has reached the first target temperature. In more specific terms, once constriction of the intake throttle is performed automatically by the semiautomatic mode, at the point in time that the exhaust temperature at the entry side of the DPF 13 measured by the temperature sensor 68 furnished at the entry side of the DPF 13 reaches 250° C. or above, the filter regenerating means 65 decides that the exhaust temperature subsequent to constriction of the intake throttle has reached the first target temperature. In a state in which the exhaust temperature has not yet reached the first target temperature, the action of constricting the intake throttle continues.

Then, in a state in which the exhaust temperature has reached the first target temperature of 250.degree. C., the filter regenerating means 65 outputs a control signal to the first lamp 70a, causing the first lamp 70a to flash (slowly flash), as shown in the "Regeneration prerequisites met" field. This flashing shows that prerequisites for regeneration are met.

At level 1, exclusive flashing of the first lamp 70a shows that prerequisites are in place for performing a second stage of heat-up control of the exhaust temperature, whereby the exhaust temperature is raised further from the first target temperature. A state in which these prerequisites are in place shows a temperature zone (250.degree. C.) of a stage such that heat-up by the second stage of heat-up control will proceed smoothly. Simultaneously with flashing of the first lamp 70a, the filter regenerating means 65 outputs a control signal to the regeneration switch 14, causing the regeneration switch 14 to flash as shown in the "SW display" field. In a case in which prerequisites for performing a second stage of heat-up control are not in place, the regeneration switch 14 remains extinguished.

By flashing of the regeneration switch 14, the worker may verify whether it is acceptable to perform a second stage of heat-up control to raise the exhaust temperature to a temperature higher than the first target temperature. With the regeneration switch 14 in the flashing state, when the regeneration switch 14 is pushed, the system advances to the second stage of heat-up control.

The second stage of heat-up in DPF regeneration involves heating up the exhaust temperature to second target temperature (for example, 600° C.) in a temperature zone that accelerates combustion of particulate matter. This second target temperature is very high as compared with the first target temperature when heat-up was performed in the first stage, and in association with the second stage of heat-up, the temperature of the gas emissions is higher as well. Because of this, as discussed previously, flashing of the regeneration switch 14 alerts that the second stage of heat-up is being performed, and affords verification when it acceptable to perform the second stage of heat-up.

When the regeneration switch 14 is pushed (by manual operation), and a command is issued to the effect that it is acceptable to bring the exhaust temperature up to the second target temperature at which combustion of particulate matter is accelerated, the filter regenerating means 65 promptly outputs a command to the engine ECU 61 or anther component, and initiates post-injection, raising the exhaust temperature at once towards the second target temperature (600° C.) in a temperature zone that accelerates combustion of particulate matter.

Moreover, when the regeneration switch 14 is pushed, the filter regenerating means 65 outputs a control signal to the first lamp 70a and to the regeneration switch 14, whereupon the first lamp 70a changes from flashing to illuminated as shown in the "Regeneration in progress" field, and the regeneration switch 14 changes from flashing to illuminated as shown in the "SW display" field. Steady lighting of the first lamp 70a and the regeneration switch 14 shows that DPF regeneration, specifically, post-injection, is being performed.

In the manner discussed above, when the PM accumulated amount reaches the first threshold value or above, the filter regenerating means 65 enters semiautomatic mode, in which constriction of the intake throttle is performed, bringing the exhaust temperature to the first target temperature. In this stage, when the regeneration switch 14 is pushed, post-injection is carried out, bringing the exhaust temperature to the second target temperature, and reducing the PM accumulated amount.

Once constriction of the intake throttle is performed in the first stage of heat-up, the exhaust temperature rises to the first target temperature (250° C.); however, there are rare instances in which the exhaust temperature is not brought up within a short time, and remains below 250° C., even when constriction of the intake throttle has been performed.

In such cases, the filter regenerating means 65 outputs a control signal to the third lamp 72, causing the third lamp 72 to flash (slowly flash), as shown in the "Regeneration prerequisites unmet/regeneration failed or interrupted" field. Flashing of the third lamp 72 shows to "prompt the worker to raise the engine speed through manual operation of the accelerator lever or the like." It is also acceptable for the filter regenerating means 65 to output a control signal causing the third lamp 72 to flash, when a state in which the exhaust temperature is below the first target temperature persists and has continued for a few seconds subsequent to constriction of the intake throttle.

In so doing, in a case in which the third lamp 72 is flashing in a state in which the regeneration switch 14 is extinguished, prior to the second stage of heat-up the worker can ascertain that the stage is one in which the exhaust temperature must be brought up by a manual operation, and can manually operate the accelerator lever to raise the engine speed during the interim that work is being performed, etc. When the engine speed rises, the exhaust temperature rises. Here, the exhaust temperature is brought up by the rise in engine speed, and when the exhaust temperature reaches the first target temperature or above, the filter regenerating means 65 halts output of the control signal to the third lamp 72, extinguishing the third lamp 72.

In a case in which post-injection is carried out in the second stage of heat-up, in a manner analogous to constriction of the intake throttle, there are instances in which, due to fluctuation of the load on the tractor 1 or the like, the exhaust temperature is not brought up smoothly, and remains below the first target temperature. In such a case as well, the filter regenerating means 65 outputs a control signal to the third lamp 72 and flashes (slowly flashes) the third lamp 72, as shown in the "Warning: divergence from prerequisites while regeneration control in progress" field, and in a manner analogous to constriction of the intake throttle, prompts the worker to raise the engine speed through manual operation of the accelerator lever or the like. The filter regenerating means 65 also halts the post-injection of the second stage of heat-up, as well as outputting a control signal to the first lamp 70a and the regeneration switch 14, changing the first lamp 70a from illuminated to flashing, and extinguishing the regeneration switch 14.

Optionally, when, subsequent to post-injection, a state in which the exhaust temperature is less than the first target temperature continues to persist for several seconds, the filter regenerating means 65 may output a control signal to flash the third lamp 72, output a control signal to bring the first lamp from illuminated to flashing, or output a control signal to extinguish the regeneration switch 14.

In so doing, in a case in which the worker has initially pushed the regeneration switch 14 and verified (allowed) the second stage of heat-up, it can be ascertained from subsequent flashing of the third lamp 72 that the stage is one in which the second stage of heat-up has not advanced smoothly, and that accordingly the exhaust temperature must be raised by a manual operation.

Here, once the exhaust temperature has been brought up by raising the engine speed, and the exhaust temperature has reached the first target temperature or above, the filter regenerating means 65 not only halts output of the control signal to the third lamp 72, extinguishing the third lamp 72, but also outputs a control signal to the regeneration switch 14 and flashes the regeneration switch 14, whereupon verification of the second stage of heat-up is performed a second time.

In level 1 discussed above, a case of sufficient reduction of the PM accumulated amount is considered as a return to level 0, and the first lamp 70a to the third lamp 72, and the regeneration switch 14, are all extinguished.

As shown in FIG. 9, in a case in which the PM accumulated amount fails to go below an amount that has been set as a cancel warning level (cancel warning amount) even after an extended period of time has elapsed since the PM accumulated amount reached level 1 at the first threshold value or above, for example, when the elapsed time since level 1 was reached is 1,800 seconds (30 minutes), the system enters the "Level: 2" stage. The cancel warning amount is an amount that, while less than the first threshold value, is not a sufficient reduction in the PM accumulated amount; for example, where the PM accumulated amount of the first threshold value is 100%, the cancel warning amount is set to 80% of the first threshold value, for example.

This second level is a stage in which, despite the PM accumulated amount being less than the first threshold value subsequent to DPF regeneration at level 1, the first lamp 70*a* to the third lamp 72, and the regeneration switch 14, are all extinguished, and is a stage in which not all warnings can be canceled. Level 2 is also a level in which an evaluation of DPF regeneration in level 1 is performed; once level 1 is initiated, a PM accumulated amount of less than the cancel warning amount brings about level 0, whereas one equal to or greater than the cancel warning amount brings about level 2. Naturally, in a case in which the process of level 1 is not performed, there will be no transition to level 2. Heat-up control, and control of steady lighting, extinguishment, or flashing of the first lamp 70*a* to the third lamp 72, and the regeneration switch 14, in level 2 are the same as in level 1. Therefore, description of level 2 is omitted.

Upon entering "Level: 3" at a PM accumulated amount that is higher than a second threshold value that is equal to or greater than the first threshold value, the stage is one in which the tractor 1 must be parked in a safe spot, and DPF regeneration performed manually, rather than a stage in which DPF regeneration is performed by the semiautomatic mode. In more specific terms, when the PM accumulated amount is equal to or greater than a second threshold value that is greater than the first threshold value at which semiautomatic mode is executed, the filter regenerating means 65 enters manual mode, and DPF regeneration is performed by this manual mode.

The manual mode differs from the semiautomatic mode in that it is a mode in which, once the PM accumulated amount reaches a predetermined value or greater (for example, the second threshold value or greater), when a command is received, heat-up is performed at once to a temperature zone at which combustion is accelerated (for example, the second target temperature).

In the level 1 and level 2 stages in which DPF regeneration is performed in the semiautomatic mode, the PM accumulated amount that has accumulated in the DPF 13 has a margin, as compared with the limit value below which the DPF can trap [particulate matter], and therefore even when the tractor 1 is moving through a farm field, and work by the tractor 1 is in progress, DPF regeneration may be performed while the tractor 1 is moving through the farm field. However, once the PM accumulated amount exceeds the second threshold value and accumulates to the level 3 stage, because the PM accumulated amount is approaching the limit value, there is a risk that damage to the DPF 13 will arise unless reduction of the PM accumulated amount is performed promptly. Because of this, it is necessary to park the tractor 1 in a spot away from the farm field (work site) where work is being performed, or the like, and to perform DPF regeneration in the manual mode, in a state in which travel of the tractor 1 has been halted.

In more detail, once the filter regenerating means 65 enters the manual mode, the filter regenerating means 65 outputs a control signal to the second lamp 71*a*, and flashes the second lamp 71*a*. Through flashing of the second lamp 71*a*, the worker is alerted that the PM accumulated amount has reached level 3, and prompted to stop (park) the tractor 1 in a safe spot. Upon viewing the flashing second lamp 71*a*, the worker stops the tractor 1 (prerequisite A), pulls the parking lever (prerequisite B), and puts the gear in neutral (puts the gearshift in neutral, prerequisite C), then brings the engine speed to idling speed.

Once the aforedescribed stop prerequisites A to C are in place, the filter regenerating means 65 outputs a control signal to the regeneration switch 14, causing the regeneration switch 14 to flash. Unlike in semiautomatic mode, flashing of the regeneration switch 14 in this state allows the worker to verify whether it is acceptable to command that the exhaust temperature be brought at once to the second target temperature with the tractor 1 in the stopped state; and when the worker pushes the regeneration switch 14, constriction of the intake throttle, post-injection, or the like, is performed through heat-up control by the filter regenerating means 65, bringing about heat-up at once. Unlike in semiautomatic mode, when the regeneration switch 14 is pushed in the manual mode, the filter regenerating means 65 outputs a command to the engine ECU 61, automatically raising the engine speed. Specifically, in the manual mode, a process takes place to sufficiently raise the engine speed automatically, and bring up the exhaust temperature.

Moreover, when performing DPF regeneration, the filter regenerating means 65 outputs a control signal to the second lamp 71*a* and to the regeneration switch 14, changing the second lamp 71*a* and the regeneration switch 14 from flashing to illuminated, and showing that DPF regeneration is in progress in the parked state. Whereas in the embodiment discussed previously, it was described to flash the regeneration switch 14 when prerequisites A to C are in place, it would be acceptable to instead flash the regeneration switch 14 even when all of prerequisites A to C are not in place, provided that DPF regeneration by the filter regenerating means 65 is possible.

In a case in which, once the regeneration switch 14 is flashing, a predetermined time period (for example, 10 minutes) elapses without the worker pushing the regeneration switch 14, the filter regenerating means 65 outputs a control signal to the fourth lamp 73, flashing the fourth lamp 73 and alerting the worker of an abnormal condition.

By flashing of the fourth lamp 73, the worker can be apprised that manual regeneration (forced regeneration) by pushing of the regeneration switch 14 in the manual mode has not been performed, and moreover can be apprised of having reached a stage in which the dealership that manages the tractor 1 or service personnel from the manufacturer must be called. Specifically, flashing of the fourth lamp 73 shows that it is necessary to contact the dealership of the tractor or the like, or another location, and apprise them of the condition of the DPF 13.

According to the present invention hereinabove, when in the semiautomatic mode in which the PM accumulated amount is equal to or greater than the first threshold value, the regeneration switch 14 performs a command to perform the second stage of heat-up from the first stage of heat-up (performs a command while heat-up is in process); but when in the manual mode in which the PM accumulated amount exceeds the second threshold value, executes heat-up at once to a temperature zone (600° C.) at which combustion of particulate matter is accelerated. Specifically, the regeneration switch 14 serves as a dual-purpose switch that can perform both a command to heat-up in the semiautomatic mode, and a command to heat-up in the manual mode, and switches corresponding to each mode can be constituted by a single switch, so the components can be fewer in number.

In all respects, the embodiment disclosed hereinabove is merely exemplary and should not be construed as limiting. The scope of the present invention is shown not by the preceding description, but rather by the scope of the claims, and equivalents in meaning to the scope of the claims, as well as all modifications within the scope thereof, are intended to be included therein.

In the aforedescribed embodiment, it was described to enter the manual mode in a case of accumulation to the point that the PM accumulated amount exceeds the second threshold value and has reached the level 3 stage; however, it would be acceptable to enter the manual mode when the PM accumulated amount exceeds the first threshold value and has reached the level 1 or level 2 stage. In this case, once the PM accumulated amount is equal to or greater than the first threshold value, the filter regenerating means 65 would firstly output a control signal and flash the second lamp 71a, prompting the worker to stop (park) the tractor 1 in a safe spot. Then, once the tractor 1 has fulfilled the stop prerequisites (prerequisites A to C), the filter regenerating means 65 outputs a control signal to the regeneration switch 14, and flashes the regeneration switch 14. When the worker pushes the regeneration switch 14, the filter regenerating means 65 executes constriction of the intake throttle, post-injection, or the like, by heat-up control, and performs heat-up at once. In so doing, DPF regeneration can be performed by the manual mode, even when the PM accumulated amount is equal to or greater than the first threshold value.

In the aforedescribed embodiment, it was described for the filter regenerating means 65 to heat up the exhaust temperature in order to combust particulate matter inside the DPF 13; however, this means bringing up the temperature inside the DPF 13 in order to substantially combust the particulate matter, and there would be no problem in reading exhaust temperature to mean temperature inside the DPF 13, water temperature, or the like.

The control program that constitutes the filter regenerating means 65 may be stored in the engine ECU 61, or stored in an electronic device on-board the work machine (tractor 1). The engine ECU 61 and the main ECU 62 may be integrated. Control in the engine ECU 61 and the main ECU 62 is not limited to that discussed previously, and various kinds of control may be performed, depending the work machine for implementation. For example, where the work machine is a combine, control appropriate for a combine would be performed, or where the work machine is a backhoe, control appropriate for a backhoe would be performed.

In the aforedescribed embodiment, there was described a two-stage system whereby, in semiautomatic mode, the exhaust temperature is brought up to the first target temperature, and thereafter brought up to the second target temperature. However, the exhaust temperature may be heated up in multiple stages through two or more stages, for example, in three stages, four stages, or the like, until reaching the first target temperature or until reaching the second target temperature.

What is claimed is:

1. A method of automatically-regenerating a diesel engine for a work vehicle, the work vehicle comprising a diesel engine, a gas emission cleaning device having a filter for trapping particulate matter included in gas emissions emitted from the diesel engine, and a switch outputting a first command for allowing automatic regeneration to be carried out, and outputting a second command for disallowing the allowed automatic regeneration from being carried out, comprising the steps of:

performing automatic regeneration to automatically combust and eliminate particulate matter that has accumulated in a gas emission cleaning device when the accumulated amount of the particulate matter has exceeded a predetermined value;

outputting an alert signal showing the necessity of carrying out the automatic regeneration when the accumulated amount of particulate matter has exceeded the predetermined value;

changing an automatic regeneration flag to a first flag in response to a first command to allow the automatic regeneration;

changing the automatic regeneration flag to a second flag in response to a second command to disallow the automatic regeneration;

causing the automatic regeneration to be carried out when the automatic regeneration flag is the first flag; and suspending the automatic regeneration when the automatic regeneration flag is the second flag.

2. A work machine, comprising:

a diesel engine;

a gas emission cleaning device having a filter for trapping particulate matter included in gas emissions emitted from the diesel engine;

an automatic-regeneration-allowing switch configured to output a first command to allow automatic regeneration to be carried out, and to output a second command to disallow the allowed automatic regeneration from being carried out; and at least one controller programmed to:

perform automatic regeneration to automatically combust and eliminate particulate matter that has accumulated in the gas emission cleaning device when the accumulated amount of the particulate matter has exceeded a predetermined value;

output an alert signal showing the necessity of carrying out the automatic regeneration when the accumulated amount of particulate matter has exceeded the predetermined value;

change an automatic regeneration flag to a first flag in response to the first command to allow the automatic regeneration;

change the automatic regeneration flag to a second flag in response to the second command to disallow the automatic regeneration;

cause the automatic regeneration to be carried out when the automatic regeneration flag is the first flag; and suspend the automatic regeneration when the automatic regeneration flag is the second flag.

3. The work machine of claim 2, further comprising a display device having a peripheral edge and a cover, and a driver's seat, wherein the automatic-regeneration-allowing switch is furnished between the peripheral edge of the display device and a peripheral edge of an opposed face situated on the cover of the display device and opposing the driver's seat.

4. A work machine comprising:

a diesel engine;

a gas emission cleaning device having a filter for trapping particulate matter included in gas emissions emitted from the diesel engine;

at least one controller programmed to:

perform automatic regeneration to automatically combust and eliminate particulate matter that has accumulated in the gas emission cleaning device, when the accumulated amount of the particulate matter has exceeded a predetermined value; and allow the automatic regeneration to be carried out by an external command; and an automatic-regeneration-allowing switch outputting a first command for allowing automatic regeneration to be carried out, and outputting a second command for disallowing the allowed automatic regeneration from being carried out, the automatic-regeneration-allowing switch being furnished between a peripheral edge part of a display device, and a peripheral edge part of an opposed face situated on a cover of the display device and opposing a driver's seat;

wherein when the accumulated amount of particulate matter has exceeded the predetermined value, the at least one controller outputs an alert signal showing the necessity of carrying out the automatic regeneration; and wherein when the at least one controller outputs the alert signal, the at least one controller allows the at least one controller to carry out the automatic regeneration in response to the first command from the automatic-regeneration-allowing switch.

5. The work machine of claim 4, wherein the automatic-regeneration-allowing switch is furnished on a diagonal incline in a section corresponding to one side of a steering wheel in a horizontal direction, when viewed from the steering wheel furnished between the display device and the driver's seat.

6. The work machine of claim 4, wherein a mounting part for the purpose of furnishing the automatic-regeneration-allowing switch is formed between a first left/right edge part formed to one side in a horizontal direction of the peripheral edge part of the display device, and a second left/right edge part formed to one side in the horizontal direction of the peripheral edge part of the opposed face.

7. The work machine of claim 4, wherein the at least one controller outputs the alert signal to the automatic-regeneration-allowing switch; and, based on the outputted alert signal, the automatic-regeneration-allowing switch issues an alert that the automatic regeneration must be carried out.

8. A work machine, comprising:

a diesel engine;

a gas emission cleaning device having a filter for trapping particulate matter included in gas emissions emitted from the diesel engine;

at least one controller programmed to:

perform automatic regeneration to automatically combust and eliminate particulate matter that has accumulated in the gas emission cleaning device, when the accumulated amount of the particulate matter has exceeded a predetermined value; and set an automatic regeneration flag that shows whether to allow or to disallow automatic regeneration; and an automatic-regeneration-allowing switch outputting a first command for allowing automatic regeneration to be carried out, and outputting a second command for disallowing the allowed automatic regeneration from being carried out;

wherein when the accumulated amount of particulate matter has exceeded the predetermined value, the at least one controller outputs an alert signal showing the necessity of carrying out the automatic regeneration;

wherein the at least one controller changes the automatic regeneration flag to a first flag in response to the first command for allowing the automatic regeneration, and changes the automatic regeneration flag to a second flag in response to the second command for disallowing the automatic regeneration; and wherein when the automatic regeneration flag is the first flag, the at least one controller allows the automatic regeneration to be carried out provided the at least one controller outputs the alert signal; and when the automatic regeneration flag is the second flag, the least one controller suspends the automatic regeneration even if the at least one controller outputs the alert signal.

9. The work machine of claim 8, wherein during an interval that the at least one controller is outputting the alert signal, the at least one controller allows the automatic regeneration to be performed on the at least one controller before the at least one controller suspends automatic regeneration.

10. The work machine of claim 8, wherein the at least one controller outputs the alert signal to the automatic-regeneration-allowing switch; and, based on the outputted alert signal, the automatic-regeneration-allowing switch issues an alert that the automatic regeneration must be carried out.

* * * * *

UNITED STATES PATENT AND TRADEMARK OFFICE
CERTIFICATE OF CORRECTION

| | | |
|---|---|---|
| PATENT NO. | : 8,973,351 B2 | Page 1 of 1 |
| APPLICATION NO. | : 13/621543 | |
| DATED | : March 10, 2015 | |
| INVENTOR(S) | : Akiya Shibutani et al. | |

It is certified that error appears in the above-identified patent and that said Letters Patent is hereby corrected as shown below:

In the Claims

Column 32, Line 29, Claim 8, before "least" insert -- at --

Signed and Sealed this
Thirtieth Day of June, 2015

Michelle K. Lee
*Director of the United States Patent and Trademark Office*